United States Patent
Devaraj et al.

(10) Patent No.: US 11,405,298 B2
(45) Date of Patent: Aug. 2, 2022

(54) TRACEROUTE FOR OVERLAYS USING DYNAMIC FILTERS

(71) Applicant: Arista Networks, Inc., Santa Clara, CA (US)

(72) Inventors: Naveen Kumar Devaraj, San Jose, CA (US); Rajshekhar Biradar, Bengaluru (IN)

(73) Assignee: Arista Networks, Inc., Santa Clara, CA (US)

(*) Notice: Subject to any disclaimer, the term of this patent is extended or adjusted under 35 U.S.C. 154(b) by 164 days.

(21) Appl. No.: 16/871,701

(22) Filed: May 11, 2020

(65) Prior Publication Data
US 2021/0352000 A1 Nov. 11, 2021

(51) Int. Cl.
*H04L 43/10* (2022.01)
*H04L 43/12* (2022.01)
*H04L 45/02* (2022.01)
*H04L 45/00* (2022.01)
*H04L 101/622* (2022.01)

(52) U.S. Cl.
CPC .............. *H04L 43/10* (2013.01); *H04L 43/12* (2013.01); *H04L 45/02* (2013.01); *H04L 45/20* (2013.01); *H04L 45/38* (2013.01); *H04L 45/66* (2013.01); *H04L 61/6022* (2013.01)

(58) Field of Classification Search
CPC combination set(s) only.
See application file for complete search history.

(56) References Cited

U.S. PATENT DOCUMENTS

| 8,724,503 B2* | 5/2014 | Johnsson | H04L 43/50 370/252 |
| 9,313,124 B2* | 4/2016 | Bosshart | H04L 45/20 |
| 9,985,794 B2 | 5/2018 | Pani | |
| 10,333,853 B1* | 6/2019 | Seshadri | H04L 45/20 |
| 2005/0207410 A1* | 9/2005 | Adhikari | H04L 69/22 370/389 |
| 2013/0058235 A1* | 3/2013 | Johnsson | H04L 43/0882 370/252 |
| 2018/0337839 A1* | 11/2018 | Bristow | H04L 41/12 |

OTHER PUBLICATIONS

E. Nordmark et al., "Layer-Transcending Traceroute for Overlay Networks like VXLAN draft-nordmark-nvo3-transcending-traceroute-03", VMware, Jul. 2016, 22 pages.

* cited by examiner

*Primary Examiner* — Xavier S Wong
(74) *Attorney, Agent, or Firm* — Fountainhead Law Group P.C.

(57) ABSTRACT

The disclosure describes processing packets in connection with a traceroute session in an overlay network that includes detecting traceroute probes using static and dynamic rules and using the time to live (TTL) value in a received traceroute probe to compute an outer TTL value. The TTL value (inner TTL) of the received probe is updated based on the number of underlay routers (hops) comprising the underlay network that are detected during the traceroute session. The received probe with its updated TTL value is encapsulated in an outer frame that includes the computed outer TTL value. The number of hops is updated each time an underlay router sends an ICMP time exceeded message.

20 Claims, 16 Drawing Sheets

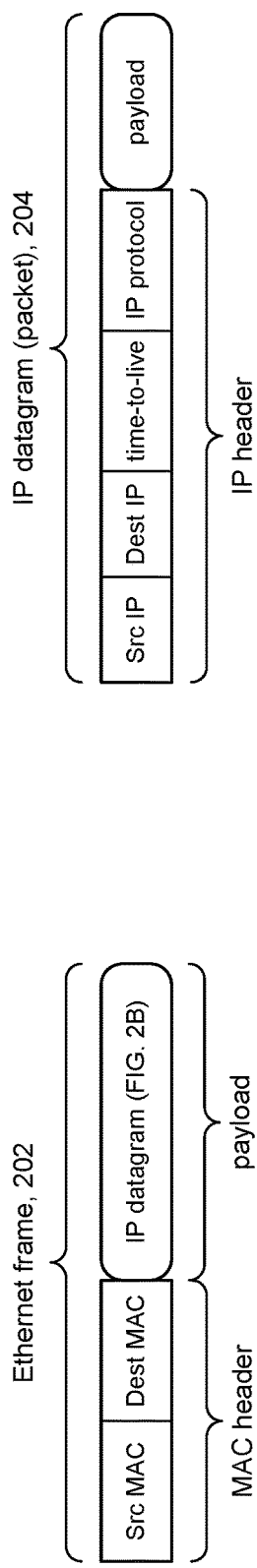
FIG. 2A
FIG. 2B
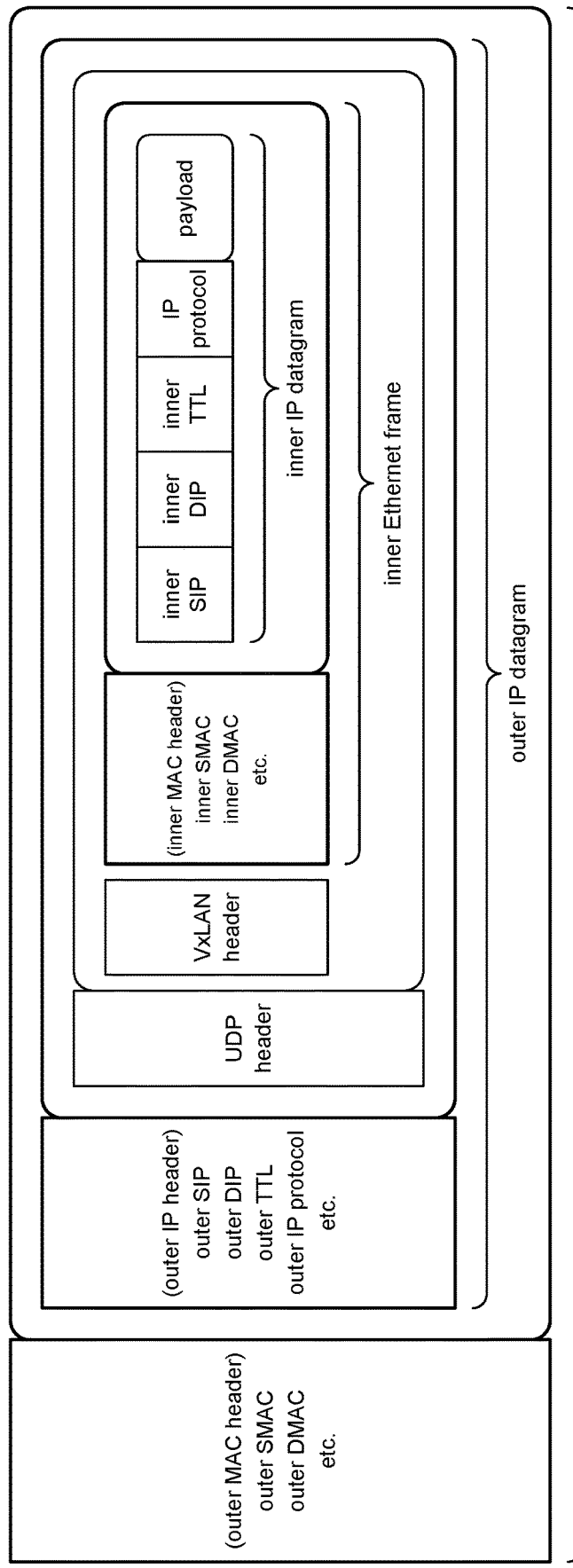
FIG. 2C

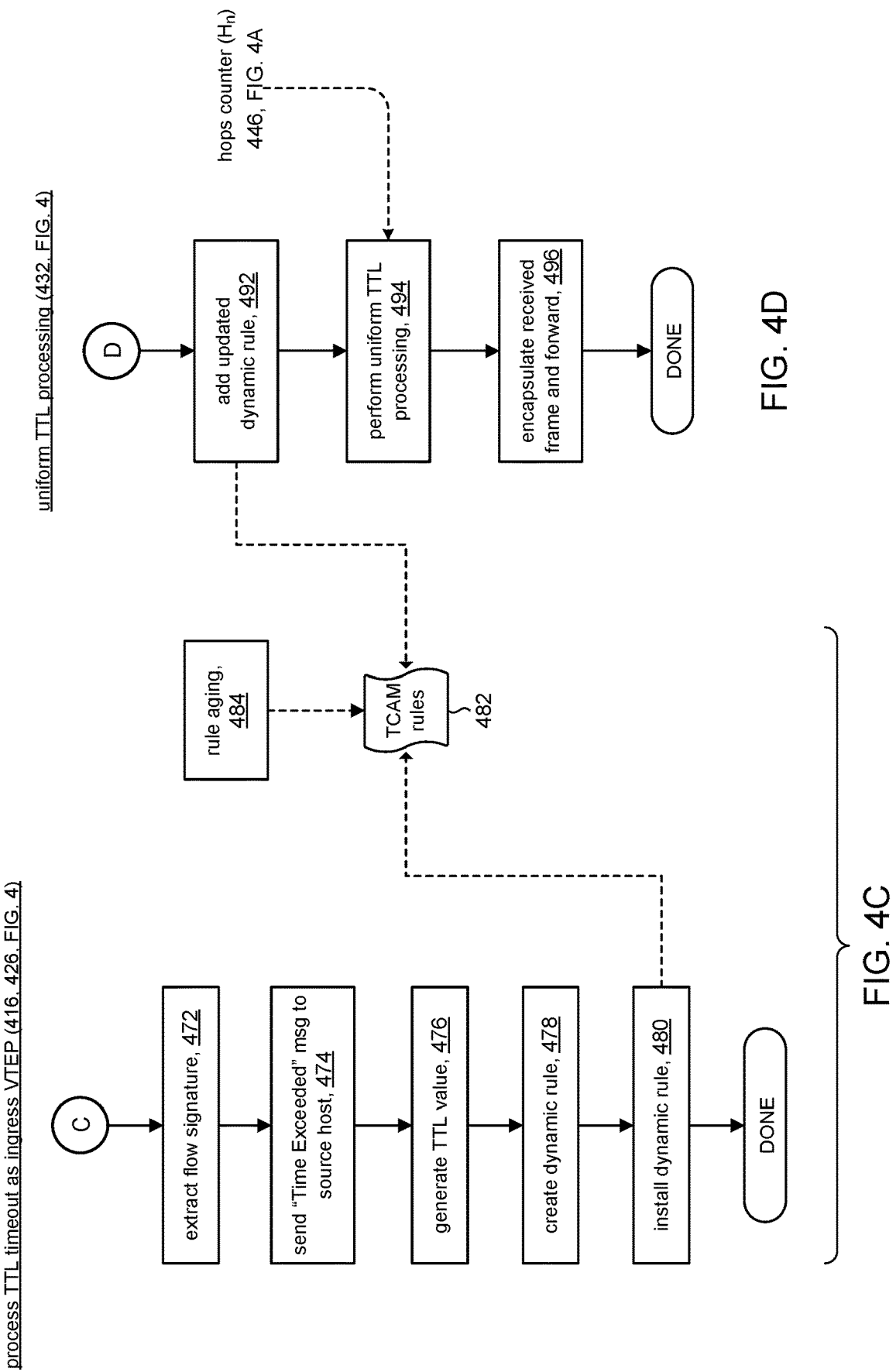

TRACEROUTE FOR OVERLAYS USING DYNAMIC FILTERS

BACKGROUND

Traceroute is a well-known network diagnostic tool used to track in real-time the pathway taken by a packet (referred to as a traceroute probe) on an Internet protocol (IP) network from source to destination and report the IP addresses of all network devices encountered in between. Traceroute records the time taken for each hop the probe makes during its route to the destination. Traceroute can be used to diagnose causes of response delays and routing loops present in a network pathway, and to identify points of failure between source and destination.

The traceroute utility is typically based on Internet Control Message Protocol (ICMP) echo packets or user datagram protocol (UDP) packets, with variable time to live (TTL) values. The response time of each hop is calculated. Traceroute uses ICMP error messages and TTL fields in the IP address header to function. Traceroute is typically included as a utility with operating systems (OS's) such as the Windows® OS and the Unix® OS.

SUMMARY

In accordance with the present disclosure, a network device can gather information about other network devices along a path between a sending computer and a receiving computer. Processing can include the network device receiving a stream of ingress packets from the sending computer. The network device can identify a traceroute probe in the stream of ingress packets using a filter that matches for a first time-to-live (TTL) value in the stream of ingress packets. The traceroute probe can be encapsulated in an egress packet including: decrementing an inner TTL value of the traceroute probe; determining an outer TTL value of the egress packet based on the decremented inner TTL value; and adjusting the decremented inner TTL value by an amount based on a hops counter that indicates a number of network devices along a segment of the path between the sending computer and the receiving computer. The network device can forward, the egress packet and update the filter to match for a second TTL value in the stream of ingress packets to identify a subsequent traceroute probe in the stream of ingress packets.

The filter can match for a flow signature that indicates the sending computer, in addition to matching the first TTL value, to identify the traceroute probe. The network device can detect an initial traceroute probe of a traceroute session and extract the flow signature from the initial traceroute probe, wherein the flow signature identifies subsequent traceroute probes in the traceroute session. The filter can include a rule that comprises a match criterion that matches for a TTL value of '1' in the stream of ingress packets to identify the initial traceroute probe.

The network device can update the filter by adding a rule to the filter to match for the second TTL value.

The network device can receive a time exceeded message from an upstream device and in response the network device incrementing the hops counter by one. The network device can increment the hops counter by one only when the network device is the destination of the time exceeded message.

The network device can receive a time exceeded message from an upstream device that is destined for the network device, and in response generate a new time exceeded message using address information contained in the received time exceeded message and transmitting the new time exceeded message to the sending computer.

The network devices along the segment of the path between the sending computer and the receiving computer can be routers.

The filter can include a rule to match for an ingress packet having both an outer TTL and an inner TTL value of '1', and in response to the rule matching a received ingress packet from a sending network device, transmit a time exceeded message: to the sending network device when an inner destination media access control (DMAC) address in the received ingress packet is not the same as a MAC address of the network device; and to the sending computer when the inner DMAC in the received ingress packet is the same as the MAC address of the network device.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 2A, 2B, 2C show various packets in accordance with some embodiments.

FIG. 4 and FIGS. 4A, 4B, 4C, 4D are high level flow diagrams for processing packets during a traceroute session in accordance with some embodiments.

DETAILED DESCRIPTION

Traceroute is a debugging tool used to investigate or troubleshoot network problems. Traceroute is based on the fact that the time-to-live (TTL) in the Internet protocol (IP) packet is decremented at each hop. In overlay networks such as in a virtual extensible local area network (VxLAN) tunnel, traceroute has limited visibility to the underlay network because the overlay network uses the "pipe tunnel" model which is invisible to the rest of the network.

An Internet Engineering Task Force (IETF) document entitled "Layer-Transcending Traceroute for Overlay Networks like VxLAN draft-nordmark-nvo3-transcending-traceroute-03" by Nordmark et al. (July 2016) describes the uniform TTL model where the TTL decrements uniformly for hops outside and inside the tunnel. The challenge is to apply the uniform model only to traceroute probe packets and not to regular IP traffic. It is difficult to differentiate traceroute probe packets from regular packets without using any special markers.

In one approach, the source host tags traceroute probes with a special marker. This approach imposes a restriction that the special marker can only be used by traceroute probes.

This restriction in practice is not likely to be guaranteed. Another approach is to use one of the reserved bits in the VxLAN header to designate traceroute probes. This approach "burns" one of the bits so that it cannot be used for other purposes. Both solutions require all devices (hosts, switches, routers) to be upgraded in order to designate and recognize specially marked packets as being traceroute probes.

In accordance with embodiments of the present disclosure, the uniform TTL model can be enabled by providing processing only in the tunnel endpoints (e.g., ingress and egress VxLAN tunnel endpoints (VTEPs)). As such, devices in the underlay (host machines, routers, etc.) remain unaffected and so do not need upgrades in order to benefit from the uniform TL model; the underlay is backward compatible. The present disclosure does not affect regular traffic in that no special markers are needed to identify traceroute probes, so no restrictions are imposed on regular IP packets in order to provide uniform TTL processing in a traceroute session.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
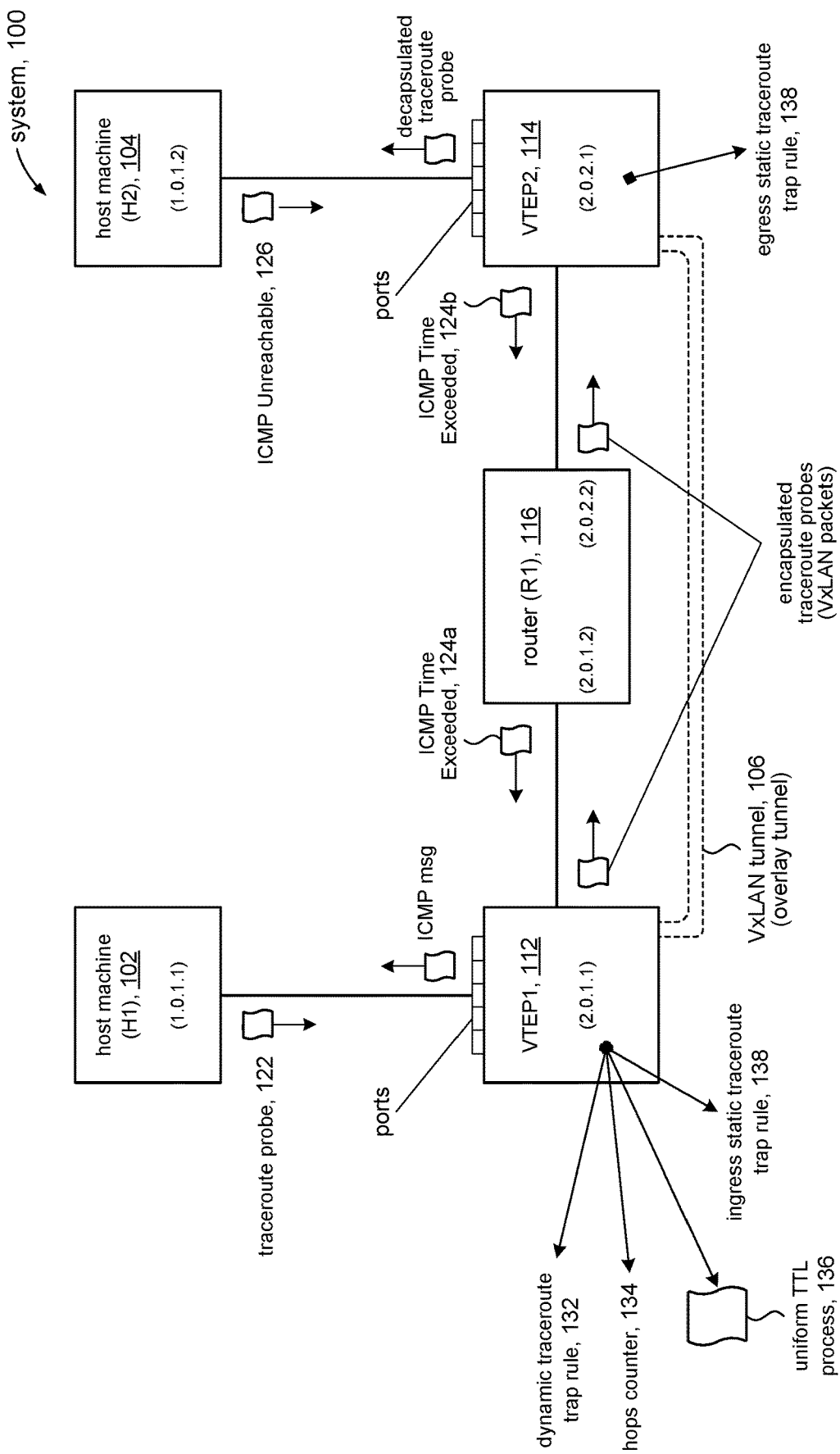
FIG. 1 illustrates a system block diagram in accordance with some embodiments.

FIG. 1 shows an illustrative configuration that can use the traceroute utility in accordance with the present disclosure. In some embodiments, for example, system 100 can include end-point computing devices 102, 104 (e.g., host machines H1, H2 respectively) connected in an overlay network. Basically, an overlay network is a virtual network that is built on top of an existing network (usually referred to as the underlay network). The virtual extensible local area network (VxLAN) overlay architecture will be used to describe embodiments in accordance with the present disclosure, with the understanding that the present disclosure can be adapted to other overlay architectures. In a VxLAN, for example, a Layer 2 (L2) overlay is built on top of a Layer 3 (L3) network. Accordingly, the L2 network can be referred to as the overlay and the L3 network can be referred to as the underlay. VxLAN provides packet transport via an overlay tunnel that connects hosts H1, H2. The illustrative embodiment in FIG. 1, for instance, shows that host machines H1 and H2 are logically connected by VxLAN tunnel 106.

In some embodiments, the underlying hardware (underlay network devices) that provides VxLAN tunnel 106 can include a VxLAN tunnel endpoint (VTEP) at each end of the tunnel. The illustrative embodiment in FIG. 1 shows that host H1 is connected to VTEP 112 (VTEP1) at one end of VxLAN tunnel 106 and host H2 is connected to VTEP 114 (VTEP2) at the other end of the tunnel. VTEP1 and VTEP2 can be any suitable network device. In some embodiments, for example, VTEP1 and VTEP2 can be layer 3 switches. A layer 3 switch can provide packet switching (layer 2) functionality where packets can be switched among host machines (not shown) connected to the switch's ports, and packet routing (layer 3) functionality where packets can be routed from one switch (e.g., VTEP 112) to another switch (e.g., VTEP 114). The VTEPs can be connected by one or more routers. The illustrative embodiment in FIG. 1, for example, shows that VTEP1 and VTEP2 are connected by router 116 (R1).

A VTEP can act as an ingress VTEP or an egress VTEP, depending on the received packet. An ingress VTEP is the VTEP that receives an original frame (e.g., Ethernet frame) to be transported across the VxLAN tunnel as a VxLAN packet. In other words, the ingress VTEP encapsulates the original frame in a VxLAN packet. Conversely, an egress VTEP is the VTEP that receives a VxLAN packet from the VxLAN tunnel and decapsulates the received VxLAN packet to recover the original frame. Referring to FIG. 1, for instance, when host machine H1 sends an original Ethernet frame to host machine H2, VTEP1 is the ingress VTEP because VTEP1 will receive the Ethernet frame and encapsulate the received Ethernet frame in a VxLAN packet. VTEP2 is the egress VTEP because it will decapsulate the VxLAN packet to recover the original Ethernet frame and transmit the original Ethernet frame to host machine H2. Conversely, when host machine H2 sends a packet to host machine H1, the ingress and egress roles are reversed, namely VTEP2 acts as the ingress VTEP and VTEP1 acts as the egress VTEP.

An initiating host machine (e.g., H1) can initiate and conduct a traceroute session with a destination (terminating) host machine (e.g., H2) by sending a series of traceroute probes 122 with increasing time-to-live (TTL) values for each successive probe. In accordance with some embodiments, the endpoint network device (e.g., VTEP1) at one end of the overlay tunnel (e.g., VxLAN tunnel 106) can be configured to support uniform TTL processing. As explained below, uniform TTL processing ensures that an inner TTL and an outer TTL are the same at the end of the tunnel so that each node along the tunnel is counted, including nodes that constitute the underlay (e.g., router R1). Uniform TTL processing in accordance with the present disclosure, therefore, can provide the initiating host machine with an accurate view of the nodes that constitute the network path between the initiating host and the destination host in an overlay architecture.

In accordance with the present disclosure, the endpoints of VxLAN tunnel 106, namely VTEP1, VTEP2 can be configured to support uniform TTL processing. More specifically, the ingress VTEP can provide uniform TTL processing in accordance with the present disclosure.

Thus, for example, when VTEP1 is the ingress VTEP, VTEP1 can process traceroute probes in accordance with the present disclosure to provide uniform TTL processing. Conversely, when VTEP2 is the ingress VTEP, VTEP2 can process traceroute probes in accordance with the present disclosure to provide uniform TTL processing. Processing details are discussed below, but briefly, in some embodiments, the ingress VTEP (e.g., VTEP1) can include a dynamic traceroute trap rule 132 that changes during a traceroute session. The dynamic trap rule allows the ingress VTEP to intercept a traceroute probe to be processed in accordance with the present disclosure. A hops count data store 134 tracks the number of hops in the overlay, and in particular the number of underlay routed hops between VTEP1 and VTEP2. Uniform TTL process 136 can process packets associated with a traceroute session in accordance with the present disclosure. Packets associated with traceroute sessions include traceroute probes 122 and Internet Control Message Protocol (ICMP) messages 124a, 124b, 126. In accordance with the present disclosure, uniform TTL process 136 includes processing of ICMP messages (e.g., 124a) that target (i.e., are addressed to) the ingress VTEP. A static ingress traceroute trap rule 138a can be used by the ingress VTEP to identify the first traceroute probe in a traceroute session. A static egress traceroute trap rule 138b can be used by the egress VTEP to identify a traceroute probe in a traceroute session.

FIGS. 2A, 2B, and 2C provide a review of some data packets involved in a traceroute session. FIG. 2A shows some data fields of an Ethernet frame 202 pertinent to a discussion of the present disclosure, including a source media access control address (SMAC), a destination MAC address (DMAC), and a payload portion which in the context of the present disclosure comprises an IP datagram. The Ethernet frame includes other data fields (e.g., preamble, CRC, etc.) that are not shown in order to simplify the illustrations.

FIG. 2B shows some data fields of an Internet Protocol (IP) datagram 204 pertinent to a discussion of the present disclosure, including a source IP address (SIP), a destination IP address (DIP), a time-to-live (TTL) value, an IP protocol field, and a payload portion. The TTL represents the maximum number of hops (nodes) that a packet can take before it is discarded. Other data fields (e.g., version, header checksum, etc.) comprising an IP datagram are not shown in order to simplify the illustrations. As explained below, in some embodiments, the traceroute probe is an IP datagram.

FIG. 2C shows some data fields of a VxLAN packet 206 pertinent to a discussion of the present disclosure. When an ingress VTEP (e.g., VTEP1) receives an (original) Ethernet frame from a host machine (e.g., H1) that is directed to a host machine (e.g., H2) on a VxLAN tunnel (e.g., VxLAN tunnel 106), the ingress VTEP encapsulates the received Ethernet frame in a UDP/IP packet and transmits the encapsulated Ethernet frame in an "outer" Ethernet frame to a next hop device (e.g., a router). The outer Ethernet frame can be referred to as the VxLAN packet or VxLAN frame. The originally received Ethernet frame can be referred to as the "inner" Ethernet frame. The "outer" and "inner" designations refer to the encapsulating components (e.g., outer Ethernet frame, outer IP packet) and the encapsulated components (e.g., inner Ethernet frame, inner IP packet), respectively. For example, the description will refer to inner and outer DMACs and SMACs, inner and outer SIPs and DIPs, inner and outer TTLs, and so on.

Figure 3:
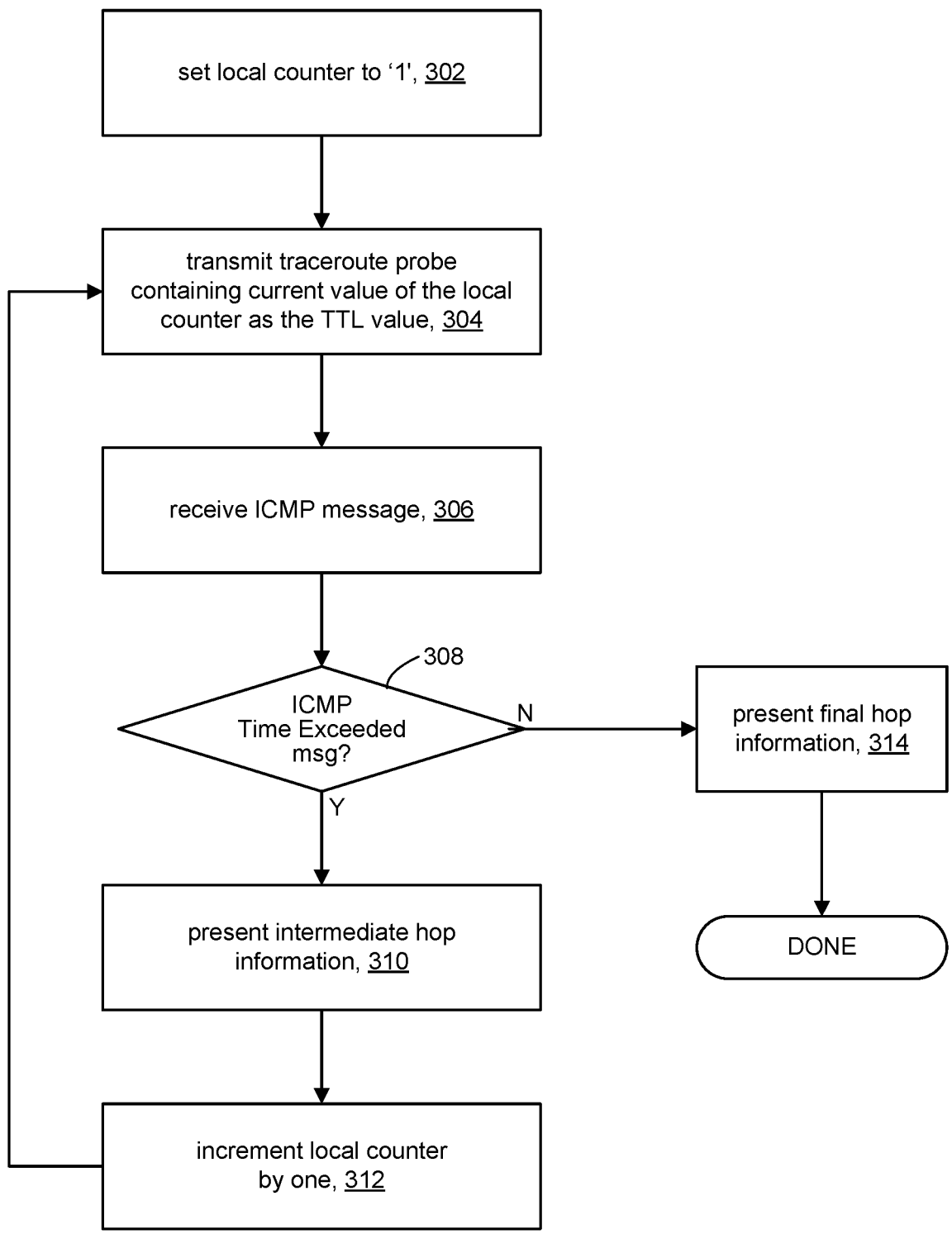
FIG. 3 is a high level flow diagram for a traceroute session.

Referring to FIG. 3, the traceroute utility can identify the nodes between a source (initiating host machine) and a destination host machine and packet transit times from the source to each of the nodes. FIG. 3 shows the basic operations at the host machine for a traceroute session. For discussion purposes, reference will be made to host machines H1, H2 depicted in FIG. 1 as needed, where host H1 (sending host) initiates a traceroute session with destination host H2 (receiving host). A traceroute session can be initiated by a user on host H1 executing a traceroute utility.

At operation 302, host H1 can set a local counter to '1'. Host H1 can use the local counter to keep track of the number of hops between H1 and H2. The local counter can be used to set the TTL value for the initial, and subsequent, traceroute probes that host H1 will transmit during the traceroute session.

At operation 304, host H1 can transmit a traceroute probe using the local counter. In some embodiments, for example, the traceroute probe can be an IP datagram (204, FIG. 2B) comprising a user datagram protocol (UDP) packet (not shown) as the payload portion of the IP datagram. A UDP packet includes a destination port data field, among other data fields. In the context of a traceroute probe, host H1 can write an unused port number, one that is not tied to a service in the destination host (e.g., in the range 33434 to 33534), into the destination port data field of the UDP packet; the role of the unused port number is explained below. The TTL data field of the IP datagram can be set equal to the current value of the local counter. The initial traceroute probe will therefore have a TTL value of '1'. Host H1 can transmit the traceroute probe upstream to the next hop device, which in our example in FIG. 1 is VTEP1. Processing in VTEP1 is discussed below.

At operation 306, host H1 can receive an ICMP message in response to transmitting the traceroute probe. The ICMP message can either be a "Time Exceeded" message or an appropriate session termination message. At each hop device (e.g., router), the TTL data field in the IP datagram is updated by decrementing the value by one. If the updated TTL value is not zero, the hop device will forward the IP datagram with the updated TTL to the next hop device. If the TTL value is zero, the hop device will respond to the sender of the IP datagram with a "Time Exceeded" ICMP message. If the IP datagram reaches the destination host H2, the destination host will respond to the unused destination port number by sending a session termination message to the sender of the datagram. For example, for ICMP-based traceroute probes, the session termination message can be an ICMP Echo Reply that the destination host sends to mark the conclusion of the traceroute session. For UDP-based traceroute probes, the session termination message can be an ICMP "Destination Unreachable" message. The present disclosure is explained in the context of ICMP-based traceroute processing, with the understanding that the present disclosure can be adapted to UDP-based traceroutes.

At operation 308, when host H1 receives a "Time Exceeded" message, processing can continue at operation 310. When host H1 receives a session termination message (e.g., ICMP Echo Reply or "Destination Unreachable" message), processing can continue at operation 314.

"Time Exceed" Message

At operation 310, host H1 can present information (e.g., IP address) relating to the hop device that sent the "Time Exceeded" message. The information can be displayed to a user, captured in a file, and so on.

At operation 312, host H1 can increment the local counter by one in preparation for the next (subsequent) traceroute probe in the traceroute session. Processing can return to operation 304 to transmit the next traceroute probe. The next traceroute probe will advance one more hop than the previous traceroute probe because the TTL value vis-à-vis the local counter has been incremented.

Session Termination Message

At operation 314, host H1 can present information (e.g., IP address) relating to host H2 which sent the session termination message. Because the traceroute probe has reached the destination, the traceroute session can be deemed complete at this point.

Figure 4:
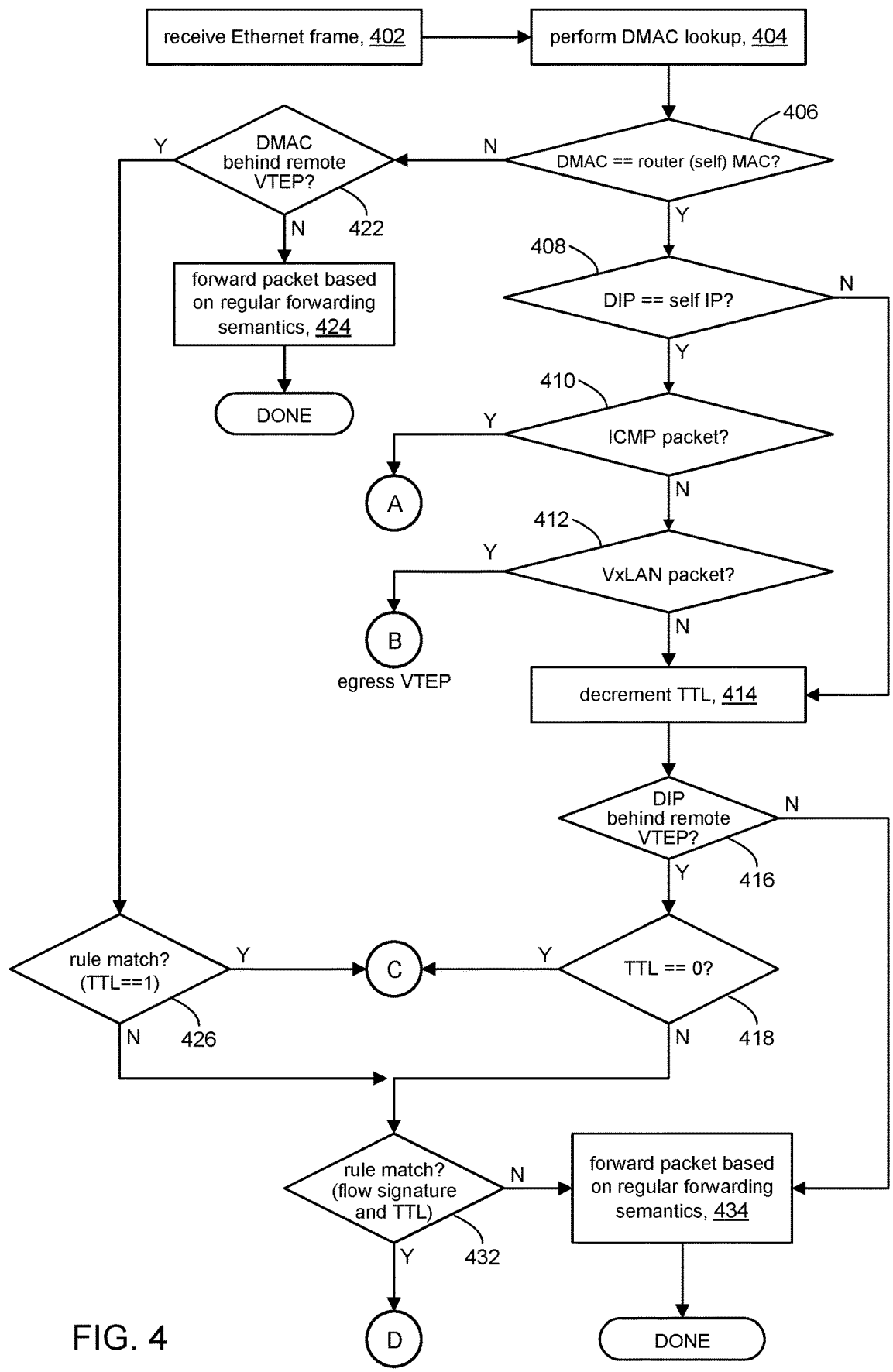

Referring to FIG. 4, the discussion will now turn to a high level description of operations and processing in a VTEP (as ingress VTEP or egress VTEP) to process traceroute probes in accordance with the present disclosure to provide uniform TTL processing. In some embodiments, the VTEP can include computer executable program code, which when executed by processor(s) comprising the VTEP (e.g., in the control plane or the data plane, FIG. 9), can cause the VTEP to perform processing in accordance with FIG. 4. The operation and processing blocks described below execute in either the data plane or the control plane of the VTEP.

At operation 402, the VTEP can receive an Ethernet frame containing an IP datagram (packet) in the payload portion of the frame. Referring to FIG. 1, for example, VTEP1 can receive an Ethernet frame from host H1 or from router R1. Likewise, VTEP2 can receive an Ethernet frame from router R1 or from host H2. As will become clear, the payload in the received Ethernet frame can contain a traceroute probe, an ICMP message, or regular traffic. In addition, the received Ethernet frame can be a VxLAN packet that encapsulates a traceroute probe, an ICMP message, or regular traffic.

At operation 404, the VTEP can perform a DMAC lookup using the DMAC in the received Ethernet frame (FIG. 2A). Recall, in some embodiments, the VTEP can be a layer 3 switch. The switch can include a forwarding information base (FIB) that contains a list of MAC addresses and corresponding port identifiers that identify ports of the switch on which to forward the received Ethernet frame. The DMAC lookup can indicate whether the DMAC in the received Ethernet frame is behind one of the ports of the switch or behind a remote VTEP (e.g., VTEP2).

At operation 406, the VTEP can determine or otherwise detect whether or not the DMAC in the received Ethernet frame is the DMAC of the VTEP itself (can be referred to as "self MAC"). If the DMAC in the received Ethernet frame is not equal to the VTEP's self MAC, then the VTEP is not the final destination of the Ethernet frame, which implies the received Ethernet frame needs to be bridged and so processing can proceed to operation 422 discussed below. If the DMAC in the received Ethernet frame is equal to the VTEP's self MAC, then the VTEP is the final destination of the Ethernet frame and processing can proceed to operation 408 (discussed next) where the Ethernet frame can be processed by the VTEP in accordance with the present disclosure.

At operation 408, the VTEP can determine or otherwise detect whether the destination IP address (DIP) in the IP datagram contained in the received Ethernet frame is equal to the VTEP's self IP. If the DIP in the IP datagram is not equal to the self IP, then the VTEP is not the final destination of the IP datagram which implies the IP datagram needs to be routed to be processed by the next hop; processing can proceed to operation 414 discussed below. If the DIP in the IP datagram is equal to self IP, then the VTEP is the final destination of the IP datagram and processing can proceed to operation 410 (discussed next) where the datagram can be processed by the VTEP in accordance with the present disclosure.

At operation 410, the VTEP can determine or otherwise detect whether the IP datagram is an Internet Control Message Protocol (ICMP) packet. In some embodiments, for example, the determination can be based on the IP protocol data field in the IP datagram. If the datagram is an ICMP packet, processing can proceed to continuation point A (FIG. 4A) to process the packet in accordance with the present disclosure. If the datagram is not an ICMP packet, processing can proceed to operation 412.

At operation 412, the VTEP can determine or otherwise detect whether the IP datagram is VxLAN packet, for example, based on whether the payload of the IP datagram contains a UDP packet containing a VxLAN header (FIG. 2C). If the IP datagram is a VxLAN packet, the VTEP is an egress VTEP (e.g., VTEP2) and the VxLAN packet was sent by an ingress VTEP (e.g., VTEP1). Processing can proceed to continuation point B (FIG. 4B) to perform operations of an egress VTEP in accordance with the present disclosure. If the datagram is not a VxLAN packet, then the VTEP is an ingress VTEP and the IP datagram can be routed. Processing can proceed to operation 414.

At operation 414, the VTEP (operating as an ingress VTEP) can process the IP datagram according to standard conventional routing operations. As explained above, when an IP packet is routed, the TTL data field in the packet is decremented and processed according to whether the decremented value is '0' or not.

At operation 416, the ingress VTEP can determine or otherwise detect whether the DIP in the IP datagram contained in the received Ethernet frame is behind a remote VTEP. If not, then processing can proceed to operation 434 to forward the received Ethernet frame according to regular forwarding semantics; otherwise, processing can proceed to operation 418.

At operation 418, the ingress VTEP can determine or otherwise detect whether or not the TTL value has reached '0'. When TTL equal '0', this can indicate that the ingress VTEP has received an initial traceroute probe from a host machine for a traceroute session, such as shown in the configuration of FIG. 1 between host H1 and VTEP1 for example. Processing can proceed to continuation point C (FIG. 4C) to perform uniform TTL processing in accordance with the present disclosure. If the TTL is not '0', then processing can proceed to operation 432 described below.

The discussion will now return to the top of FIG. 4 to a description of processing along the NO branch of operation 406. Recall, at operation 406, that the VTEP can determine or otherwise detect whether or not the DMAC in the received Ethernet frame is the DMAC of the VTEP itself (referred to as "self MAC"). If the DMAC in the received Ethernet frame is not equal to the VTEP's self MAC, then this can be taken to mean that the frame needs to be bridged and processing can proceed to operation 422 to process a bridged frame.

At operation 422, the VTEP can determine or otherwise detect whether or not the DMAC in received Ethernet frame is behind a VTEP, for example, based on the DMAC lookup from operation 404. If the DMAC is associated with a local port on the VTEP, then the received Ethernet frame can be deemed to be regular switched traffic and processing can proceed to operation 424 (discussed next). If the DMAC is associated with a remote VTEP (i.e., is behind the remote VTEP), then the VTEP is an ingress VTEP and processing can proceed to operation 426 to process the received Ethernet frame in accordance with the present disclosure.

At operation 424, the VTEP can treat the received Ethernet frame as regular switched traffic and can be forwarded using standard conventional forwarding semantics. Forwarding may include, for example, flooding the DMAC on all ports in the VLAN including the VxLAN flood list in order to force MAC learning if the DMAC is not learned behind a local port or behind a remote VTEP. Processing of the Ethernet frame can be deemed completed.

At operation 426, the VTEP (operating as an ingress VTEP) can determine or otherwise detect whether the TTL of the IP datagram matches a static ingress traceroute trap rule (138a, FIG. 1). In some embodiments, the VTEP can include a suitable data store of rules (also referred to as access control lists, ACLs). Rules contain match criteria to identify or filter out certain packets in a stream of packets based on various data fields in the packet, and actions to provide special processing for identified packets. In some embodiments, rules can be stored in a memory referred to as a ternary content addressable memory (TCAM). These TCAM rules can be referred to collectively as a filter. Rules can be used to reroute packets (e.g., firewalling), modify packet contents, and so on. In accordance with the present disclosure, traceroute trap rules relating to uniform TTL processing can be added to the TCAM rules in the VTEP. One such rule is referred to as a static ingress traceroute trap rule, which is triggered when the TTL value in the IP datagram is '1' and the protocol is ICMP; i.e., the match criteria are TTL==1 && IP protocol==ICMP for ICMP-based traceroute probes. The protocol can be UDP for UDP-based traceroute probes, and so on. For UDP-based probes, the static ingress trap rule can be further refined to include the Layer 4 destination port (e.g., 33434). When the static ingress traceroute trap rule is matched, this can indicate that the ingress VTEP has received an initial traceroute probe from a host machine for a traceroute session, such as shown in the configuration of FIG. 1 between host H1 and VTEP1 for example. Processing can proceed to continuation point C (FIG. 4C) to perform uniform TTL processing in accordance with the present disclosure. If the rule is not matched, then processing can proceed to operation 432.

Operations 432, 434, Operating as Ingress VTEP

At operation 432, the ingress VTEP can determine or otherwise detect whether the IP datagram matches another TCAM rule referred to as a dynamic traceroute trap rule (132, FIG. 1). This operation can be accessed from the NO branch of operation 418 and from the NO branch of operation 426. In some embodiments, for example, the dynamic traceroute trap rule can match on the datagram's flow signature and TTL value. The rule is "dynamic" in the sense that each subsequent traceroute probe during a traceroute session will generate a new rule. This aspect of the present disclosure is discussed in more detail below. If a dynamic traceroute trap rule is matched, then the IP datagram can be deemed to be a traceroute probe and processing can proceed to continuation point D (FIG. 4D) to process a traceroute probe in accordance with the present disclosure. If a dynamic traceroute trap rule is not matched, then processing can proceed to operation 434.

At operation 434, when the IP datagram does not match a dynamic rule, the datagram can be deemed to be regular traffic and thus can be forwarded using standard conventional (regular) forwarding semantics. Accordingly, the ingress VTEP can forward the IP datagram with no further processing of the TTL. For example, as an ingress VTEP the VTEP can encapsulate the received Ethernet frame (from operation 402) containing the IP datagram in a VxLAN packet (the received Ethernet frame becomes an inner Ethernet frame, FIG. 2C) and forward the VxLAN packet to the next hop device. Processing of the received Ethernet frame can be deemed completed.

The discussion of the processing shown in FIG. 4 will now continue with FIGS. 4A, 4B, 4C, and 4D.

Figure 4B:
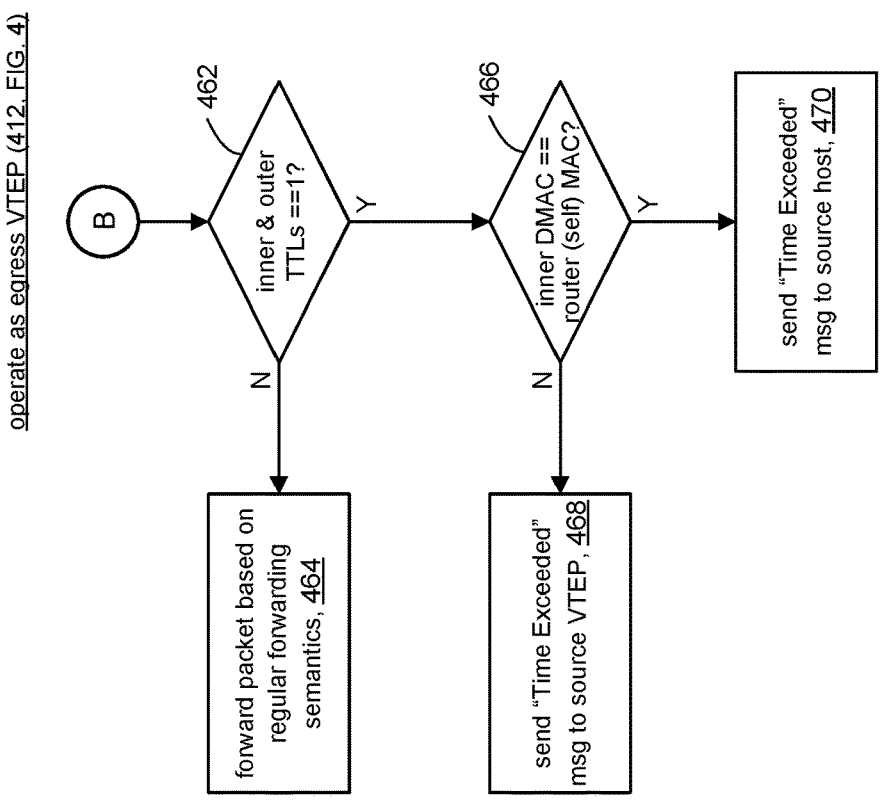
Figure 4A:
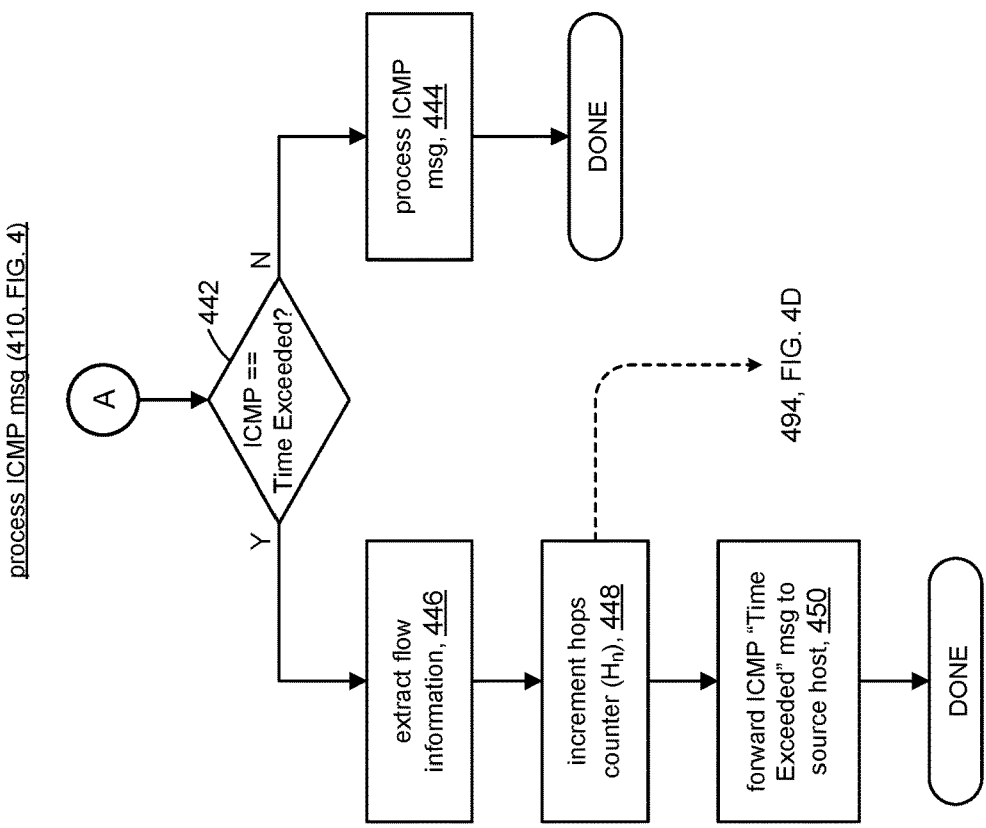

FIG. 4A—Process ICMP Message

FIG. 4A shows processing by the VTEP, as an ingress VTEP, in response to determining the received Ethernet frame contains an ICMP message (operation 410, FIG. 4), where the VTEP has been determined to be the destination of the message (operations 406, 408). As can be seen in FIG. 1, for example, we see that this scenario can arise when an ICMP message comes directly from router R1; i.e., router R1 detected a TTL timeout (TTL==0).

At operation 442, the ingress VTEP can determine whether the ICMP message is a "Time Exceeded" message or not, based for example, on the Type data field in the ICMP message. If the ICMP message is not a "Time Exceeded" message, then processing can proceed to operation 444. If the ICMP message is a "Time Exceeded" message, then processing can proceed to operation 446 to process the message in accordance with the present disclosure.

At operation 444, the ingress VTEP can process the ICMP message according to the type of message designated in the Type data field in accordance with standard operations for processing an ICMP message. Processing of the received Ethernet frame can be deemed completed.

At operation 446, the ingress VTEP can extract flow information from the payload portion of an ICMP "Time Exceeded". Because the ICMP message targeted the ingress VTEP, the message terminates at the ingress VTEP. However, in accordance with the present disclosure, the ICMP message needs to continue on to the source host in order for traceroute to operate. Accordingly, the extracted flow information identifies the IP of the source host. As explained below, the payload of the ICMP message includes a VxLAN-encapsulated packet (inner Ethernet frame, FIG. 2C), so the flow information for the source host can be obtained from the VxLAN packet, and in particular from the inner SIP.

At operation 448, the ingress VTEP can process the ICMP "Time Exceeded" message in accordance with the present disclosure. In some embodiments, for example, the VTEP can increment a hops counter $H_n$. The hops counter serves to maintain a count of the number of hops discovered by the VTEP and represents the number of hops in the underlay, which represents a segment of the path between the sending host (e.g., host H1) and a receiving host (e.g., host H2). More specifically, a segment refers to the routers between the ingress VTEP and egress VTEP. It will be seen that the hops counter counts the number of ICMP messages sent directly to the VTEP by the underlay routers. The hops counter represents the number of underlay routed hops between ingress and egress VTEPs. The hops counter is used at operation 494 in FIG. 4D. Since a host machine (e.g., H1) can initiate several concurrent traceroute sessions, in some embodiments, the VTEP can maintain separate hops counters for each traceroute session, where $H_n$ represents the hops counter for traceroute session n.

At operation 450, the ingress VTEP can send a new ICMP "Time Exceeded" message to the source host; e.g., host H1, which can be identified, for example, based on the flow information obtained in operation 448. Since the destination of the original ICMP message was the VTEP itself, the VTEP creates a new ICMP message to send to the source host in order to continue the traceroute session. For example, in the received ICMP message, the ICMP payload will include the VxLAN-encapsulated packet which needs to be removed. The ingress VTEP can extract the source information from the inner header within the ICMP payload and create a new ICMP time exceeded message to be sent to the original source. The inner packet in the extracted payload becomes the payload in the new ICMP payload.

FIG. 4B—Operate as Egress VTEP

FIG. 4B shows processing by the VTEP as an egress VTEP (e.g., VTEP2) in response to determining that the received Ethernet frame is a VxLAN packet (412, FIG. 4) sent by the ingress VTEP (e.g., VTEP1).

At operation 462, the egress VTEP can determine whether the VxLAN payload is a traceroute probe that needs to be subject to special processing (e.g., per operation 468 or operation 470) or not. In some embodiments, for example, a static egress traceroute trap rule (e.g., 138b, FIG. 1) can be programmed in the egress VTEP. The static egress traceroute trap rule is triggered when both the outer TTL value and the inner TTL value in the VxLAN packet are equal to '1'. The static egress traceroute trap rule serves the purpose of trapping encapsulated bridged traceroute probe packets, which are not trapped by default because the TTL is not decremented as part of standard bridging/switching operation. If the rule is triggered, then the VxLAN packet represents a TTL timeout and processing can proceed to operation 466 to process the traceroute probe in accordance with the present disclosure. If the rule is not triggered, then the VxLAN packet does not represent a TTL timeout and processing can proceed to operation 464.

At operation 464, the egress VTEP can process the VxLAN packet according to standard conventional forwarding semantics. For example, the egress VTEP can decapsulate the VxLAN packet to recover the inner Ethernet frame. When the inner DMAC does not equal self MAC of the egress VTEP, then the recovered Ethernet frame can be bridged according to standard bridging operation. For example, the recovered Ethernet frame can be forwarded by doing a MAC table lookup using the inner DMAC. When the inner DMAC does equal self MAC of the egress VTEP, then the VTEP will serve as a default gateway and can route the recovered Ethernet frame according to standard routing operations, including decrementing the TTL.

At operation 466, because a determination was made at operation 462 that the VxLAN packet represents a TTL timeout, the egress VTEP can determine how to send the time exceeded message based on whether or not the inner DMAC is equal to self MAC. If the inner DMAC is not equal to self MAC, then the time exceeded message can be sent according to operation 468. If the inner DMAC is equal to self MAC, then then the time exceeded message can be sent according to operation 470.

At operation 468, the egress VTEP can send an ICMP "Time Exceeded" message, in response to detecting a TTL timeout. In accordance with the present disclosure, an ICMP "Time Exceeded" message is generated and sent directly to the source VTEP when the inner DMAC is not equal to self MAC. In some embodiments, the egress VTEP can copy the VxLAN packet into the payload portion of the ICMP message and send the ICMP message to the ingress VTEP using standard routing semantics for routing packets.

At operation 470, the egress VTEP can send an ICMP "Time Exceeded" message, in response to detecting a TTL timeout. In accordance with the present disclosure, an ICMP "Time Exceeded" message is generated and sent directly to the source host. In some embodiments, the egress VTEP can decapsulate the VxLAN packet and copy the obtained inner Ethernet frame into the payload portion of the ICMP message. The ICMP message can be sent to the source host using standard semantics for sending packets over a VxLAN including, for example, encapsulating the ICMP message in a VxLAN packet, routing it to the other VTEP which will then decapsulate and forward to the source host.

FIG. 4C—Process TTL Timeout as Ingress VTEP

FIG. 4C shows processing by the VTEP as an ingress VTEP in response to detecting a TTL timeout (418, 426, FIG. 4) in the IP datagram contained in the received Ethernet frame.

At operation 472, the ingress VTEP can extract a flow signature from the IP datagram contained in the payload portion of the received Ethernet frame. In some embodiments, for example, the matching criteria that define the flow signature can include:
  inner SIP and DIP from the raw un-encapsulated packet; and (IP protocol←ICMP)+ICMP ID.

As can be seen from FIG. 4, the flow signature is obtained from the initial traceroute probe of a traceroute session, which is trapped by the static ingress rule. This flow signature is used to trap subsequent traceroute probes sent during the traceroute session.

At operation 474, the ingress VTEP can send an ICMP "Time Exceeded" message based on the SIP obtained at operation 472, in response to detecting a timeout in the TTL.

At operation 476, the ingress VTEP can generate a TTL value for the dynamic rule (discussed in the next operation). In accordance with the present disclosure, the TTL value can be generated by taking the TTL value in the IP datagram and adding 1. The generated TTL value is the expected TTL value in the next traceroute probe.

At operation 478, the ingress VTEP can create the initial (dynamic) traceroute trap rule from the flow signature obtained at operation 472 and the TTL value generated at operation 476. The initial dynamic rule will have a TTL value of '2'. The dynamic rule will match subsequent traceroute probes for a given traceroute session; the flow signature portion of the dynamic rule identifies the initiator of the traceroute session and the TTL value identifies the next traceroute probe in the session.

At operation 480, the ingress VTEP can install the dynamic rule, for example, in the VTEP's TCAM rules data store 482, thus completing processing of the received Ethernet frame.

FIG. 4C also shows a rule aging process 484 that can run in the background to delete old rules. For example, rules that have been in the TCAM for some period of time (e.g., on the order of seconds to minutes) can be aged out (deleted). This aging out process prevents the TCAM 482 from overflowing due to old or unused rules. During the course of a traceroute session, previously generated dynamic rules will no longer be triggered as the TTL value is progressively increased. The rule aging process 484 can prevent no longer used dynamic rules from overflowing the TCAM by eventually deleting previously triggered dynamic rules.

FIG. 4D—Uniform TTL Processing

FIG. 4D shows processing by the VTEP as an ingress VTEP in response to matching a dynamic traceroute trap rule (432, FIG. 4) indicating that the IP datagram contained in the received Ethernet frame is a traceroute probe.

At operation 492, the ingress VTEP can generate an updated dynamic rule. The matched dynamic rule served to identify a traceroute probe from the source host having a given TTL value. In order to detect the next traceroute probe in the session, a new dynamic rule can be created from the matched dynamic rule, by using the same flow signature (e.g., operation 471, FIG. 4C) and incrementing the value of the TTL matching criterion. The newly generated dynamic rule can be installed in the TCAM rules data store 482. Recall from the discussion above, that the rule aging process 484 will eventually age out the matched dynamic rule.

At operation 494, the ingress VTEP can perform uniform TTL processing, and route the resulting VXLAN packet to the remote (egress) VTEP. Referring to FIG. 2C, the received Ethernet frame becomes the inner Ethernet frame which is encapsulated in an outer IP datagram. The TTL in the encapsulated inner Ethernet frame is referred to as the inner TTL and the TTL in the outer IP datagram is referred to as the outer TTL. In accordance with some embodiments of the present disclosure, the inner and outer TTL's can be determined according to the following operations to provide uniform TTL processing:

inner TTL←inner TTL−1, the (inner) TTL in the received Ethernet frame is decremented by 1.

outer TTL←inner TTL, the outer TTL is set equal to the value of the (decremented) inner TTL.

inner TTL←inner TTL−H$_n$, the inner TTL is further decremented by the hops counter (446, FIG. 4A) for the traceroute session n.

At operation 496, the ingress VTEP can encapsulate the received Ethernet frame in a VxLAN packet as shown in FIG. 2C, for example. The VxLAN packet can then be forwarded to the next hop device, thus completing processing of the received Ethernet frame.

The discussion will now turn to some illustrative VxLAN configurations to demonstrate the processing in FIGS. 4 and 4A-4D to provide uniform TTL processing in accordance with the present disclosure. The examples below are explained using ICMP-based traceroute probes. It will be appreciated, however, that the probes can be adapted in accordance with other protocols, for example, UDP-based traceroute probes.

Configuration 1

FIGS. 5A-5D illustrate a traceroute session in an L2 overlay (VxLAN) comprising host machines H1, H2 deployed in the same subnet and connected by a VxLAN that comprises endpoints VTEP-A, VTEP-B with a single router R1 (underlay network device) between the VTEPs. The figures show the sequence of actions in a traceroute session conducted in accordance with the present disclosure. The circled numbers are time indices that serve to indicate the relative order (time) of actions in the sequence.

Time Index 1

Figure 5A:
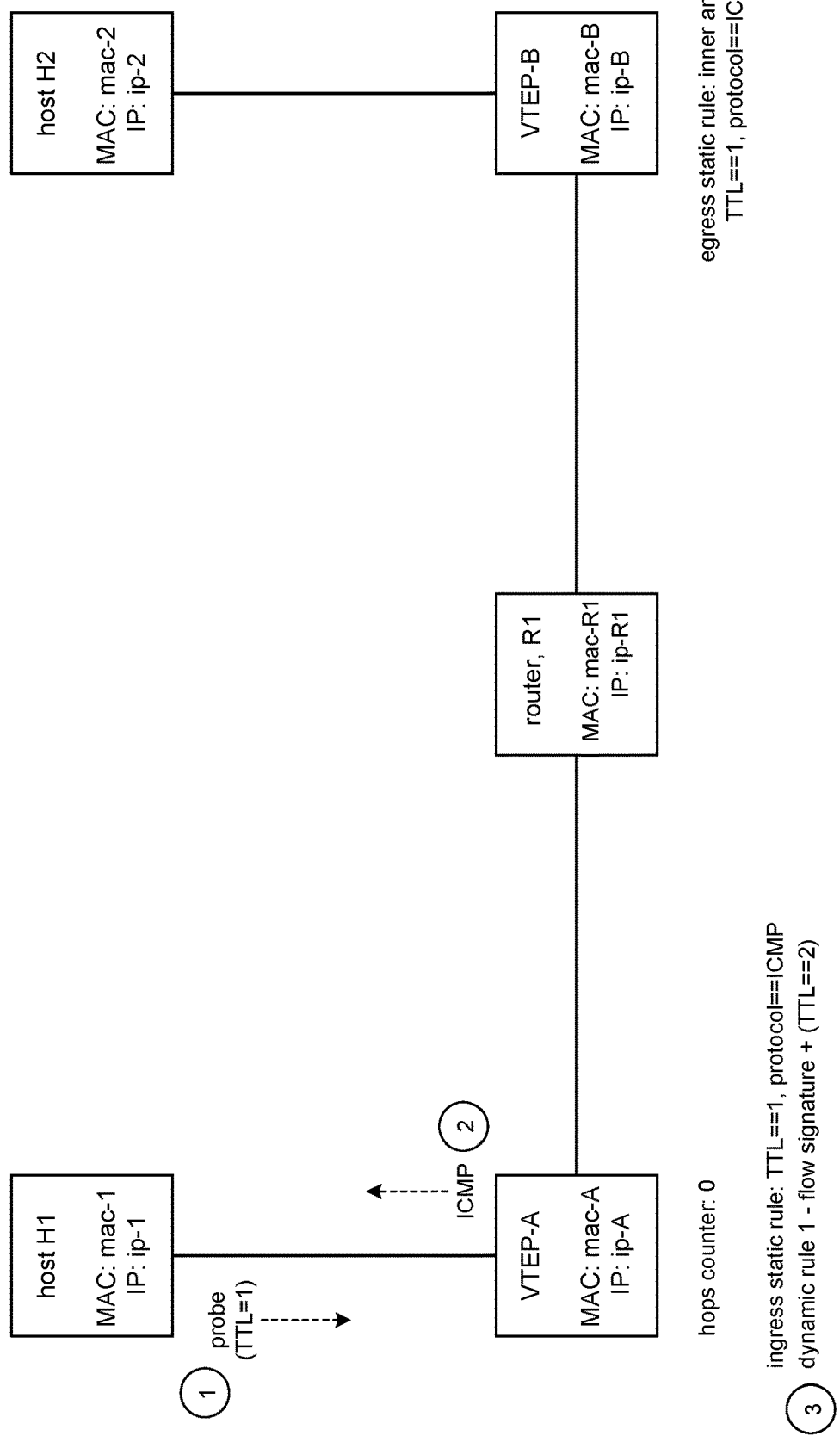
FIGS. 5A, 5B, 5C, 5D demonstrate a traceroute sequence in a first illustrative overlay configuration in accordance with some embodiments.

FIG. 5A shows host H1 (sending computer) initiating a traceroute session by sending an initial traceroute probe from H1 to host H2 (receiving computer) comprising:

probe: SMAC=mac-1, DMAC=mac-2, SIP=ip-1, DIP=ip-2, TTL=1, prot=ICMP

Time Index 2

VTEP-A receives the probe from host H1, which per the flow of operations in FIG. 4 is processed at operation 426. We will suppose for discussion purposes that mac-2 is already learned in the FIB of VTEP-A, and in particular that mac-2 is behind VTEP-B. The probe triggers the static ingress traceroute trap rule at operation 426, namely:

(ingress) static traceroute trap rule: TTL==1, prot=ICMP and so processing proceeds along the Y branch of operation 426 to FIG. 4C, where VTEP-A the following flow signature (operation 472):

inner SIP=mac-1 and DIP=mac-2 (from the traceroute probe) (IP protocol←ICMP)+ICMP ID At operation 474, VTEP-A generates the first ICMP "Time Exceeded" message:

ICMP message: SMAC=mac-A, DMAC=mac-1, SIP=ip-A, DIP=ip-1, <ICMP payload> where <ICMP payload> is the traceroute probe. The destination of the generated ICMP message is determined from the SIP contained in the received traceroute probe, namely SIP=ip-1 which is host H1. The generated ICMP message is then transmitted to host H1 and processed by H1, thus completing the first round of the traceroute session. Host H1 has detected the following hops: VTEP-A.

Time Index 3

Per operations 476-480 in FIG. 4C, VTEP-A generates and installs a dynamic traceroute trap rule (dynamic rule 1) to trap the next probe in the traceroute session. Dynamic rule 1 includes the following match criteria:

SIP==ip-1, DIP==ip-2, to match packets sourced from H1 and directed to H2 prot==ICMP, ICMP ID==id-1 to match packets of a given traceroute session

TTL==2, to match the next traceroute probe in the given traceroute session

Dynamic Rule 1 (Flow Signature)

The ICMP ID match criterion is obtained from the first traceroute probe, and will be the same for all subsequent traceroute probe packets in a given traceroute session. The hops counter is initially set to zero and remains zero at time index 2 because no underlay hops have been detected.

Time Index 4

Figure 5B:
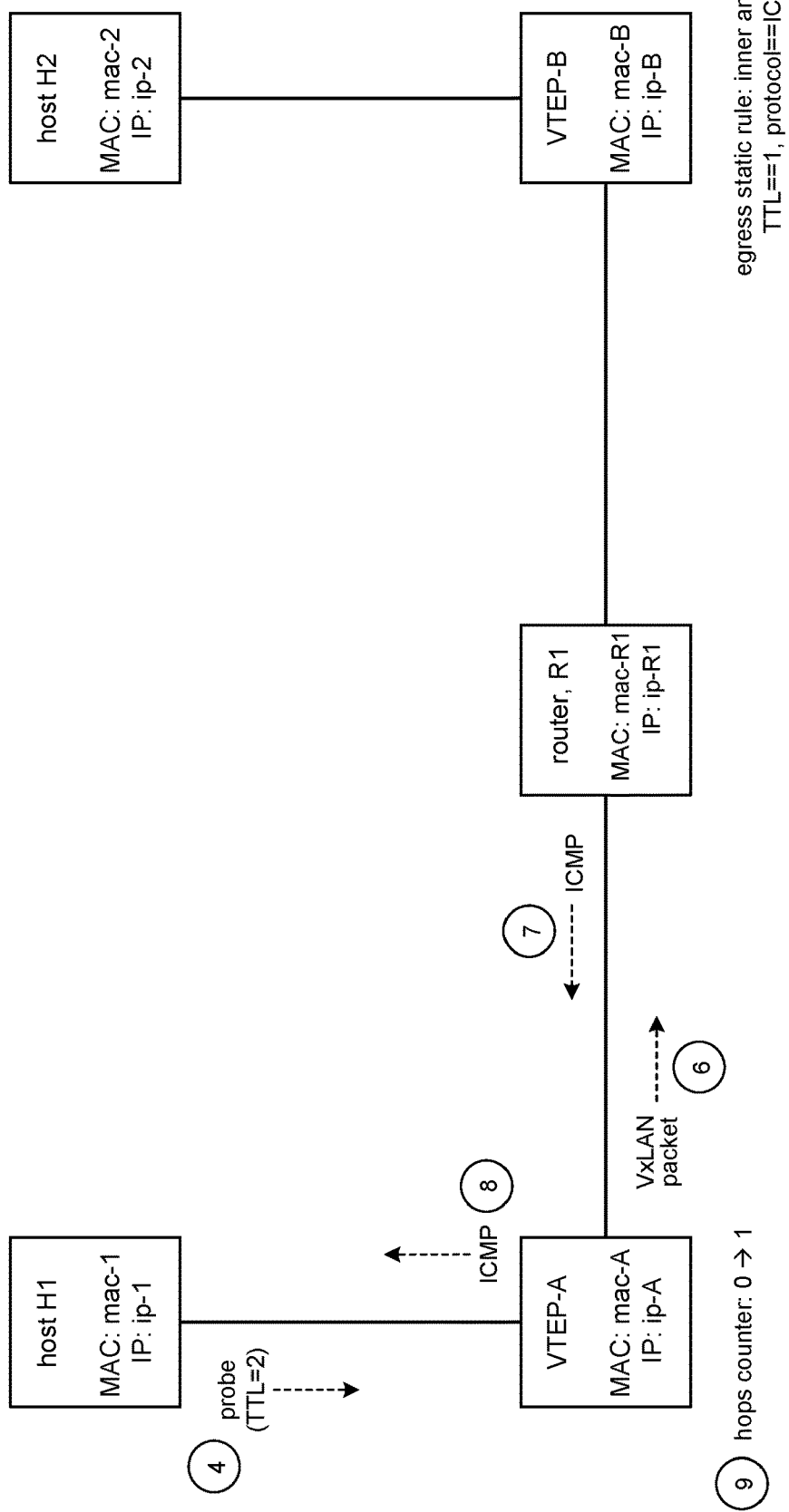

Referring to FIG. 5B, host H1 sends a subsequent traceroute probe from H1 to (destination) host H2, including incrementing the TTL to '2' in order to reach the next hop in the traceroute session, namely router R1:

probe: SMAC=mac-1, DMAC=mac-2, SIP=ip-1, DIP=ip-2, TTL=2, prot=ICMP

Time Index 5

VTEP-A receives the traceroute probe from H1, which per FIG. 4 is processed at operation 426. This time around the received probe does not trigger the static egress traceroute trap rule in VTEP-A and so processing proceeds to operation 432. The received probe matches dynamic rule 1 and so processing proceeds along the Y branch of operation 432 to FIG. 4D, where VTEP-A updates dynamic rule 1 (operation 492) by incrementing the TTL match criterion to TTL==3, and installs the updated rule (creates dynamic rule 2) to trap the next probe in the traceroute session. Dynamic rule 2 includes the following match criteria:

SIP==ip-1, DIP==ip-2, to match packets sourced from H1 and directed to H2 prot==ICMP, ICMP ID==id-1 to match packets of a given traceroute session

TTL==3, to match the next traceroute probe in the given traceroute session

Dynamic Rule 2 (Flow Signature)

Dynamic rule 1 will be aged out per operation 484, FIG. 4C.

Time Index 6

Per operation 494 in FIG. 4D, VTEP-A encapsulates the received traceroute probe in a VxLAN packet. The received traceroute probe becomes the payload of an inner IP datagram (FIG. 2C). The TTL of the probe is referred to as the inner TTL (which at this time is '2'), and the TTL of the encapsulating packet is referred to as the outer TTL. As described above in connection with operation 494, the inner TTL and outer TTL are computed according to the sequence, where inner TTL is '2' and hops counter is '0':

inner TTL←inner TTL−1 outer TTL←inner TTL inner TTL←inner TTL−hops counter

The following VxLAN packet is produced and forwarded to router R1:

VxLAN packet: SMAC=mac-A, DMAC=mac-R1, SIP=ip-A, DIP=ip-B, (outer) TTL=1, prot=VxLAN, <probe> probe: SMAC=mac-1, DMAC=mac-2, SIP=ip-1, DIP=ip-2, (inner) TTL=1, prot=ICMP

Note the (inner) TTL value of the probe has been updated according to the above computation sequence.

Time Index 7

The VxLAN packet is received by router R1 as a regular packet, so the received packet appears to the router as:
 received packet: SMAC=mac-A, DMAC=mac-R1, SIP=ip-A, DIP=ip-B, TTL=1, prot=VxLAN, <payload>
  payload: SMAC=mac-1, DMAC=mac-2, SIP=ip-1, DIP=ip-2, TTL=1, prot=ICMP where <payload> is the traceroute probe with its TTL value which was updated at time index 7. When the router decrements the TTL in the received packet (outer TTL), per conventional router processing operations, a TTL timeout occurs (because updated TTL==0) and in response the router generates an ICMP "Time Exceeded" message:
 ICMP message: SMAC=mac-R1, DMAC=mac-A, SIP=ip-R1, DIP=ip-A, <ICMP payload>
 ICMP payload: SMAC=mac-A, DMAC=mac-R1, SIP=ip-A, DIP=ip-B, TTL=1, prot=VxLAN, <payload>
  payload: SMAC=mac-1, DMAC=mac-2, SIP=ip-1, DIP=ip-2, TTL=1, prot=ICMP where <ICMP payload> is the received packet, namely the VxLAN packet, and <payload> in turn is the traceroute probe with its updated TTL value.

Per conventional processing by router R1, the destination of the generated ICMP message is determined from the SIP contained in the received packet, namely SIP=ip-A which is VTEP-A. The generated ICMP message is then transmitted to VTEP-A, with DMAC set to mac-A and DIP set to ip-A to indicate that the ICMP message is directed to VTEP-A (i.e., VTEP-A is the final destination of the ICMP message).

Time Index 8

VTEP-A receives the ICMP message from router R1 (upstream device), which per the flow in FIG. 4 proceeds along the Y branch of operation 410 to FIG. 4A because the ICMP message was directed to (destined for) VTEP-A, as indicated by the self MAC and self IP criteria have been met in respective operations 406, 408. VTEP-A obtains flow information from the received ICMP message (446, FIG. 4A) by extracting the ICMP payload information from the received ICMP message to recover the VxLAN packet, and decapsulating the recovered VxLAN packet to recover the encapsulated traceroute probe:
 probe: SMAC=mac-1, DMAC=mac-2, SIP=ip-1, DIP=ip-2, TTL=1, prot=ICMP A new ICMP message is generated with the recovered traceroute probe as its payload, and sent to the sending computer identified by the SIP in the recovered traceroute probe (flow information), namely host H1. The generated ICMP message is received and processed by host H1, thus completing the second round of the traceroute session. Host H1 has detected the following hops: VTEP-A and router R1.

Time Index 9

The hops counter is incremented (448, FIG. 4A) from '0' to '1' to reflect the detection of an underlay router, namely router R1. The operations at time indices 8 and 9 enable uniform TTL processing in accordance with the present disclosure. The ICMP "Time Exceeded" messages that are directed to VTEP-A allow VTEP-A to detect and track underlay routers. Because VTEP-A generates a new ICMP message that is sent to host H1, the traceroute session is sustained despite the ICMP "Time Exceeded" message being directed to and processed by VTEP-A.

Time Index 10

Figure 5C:
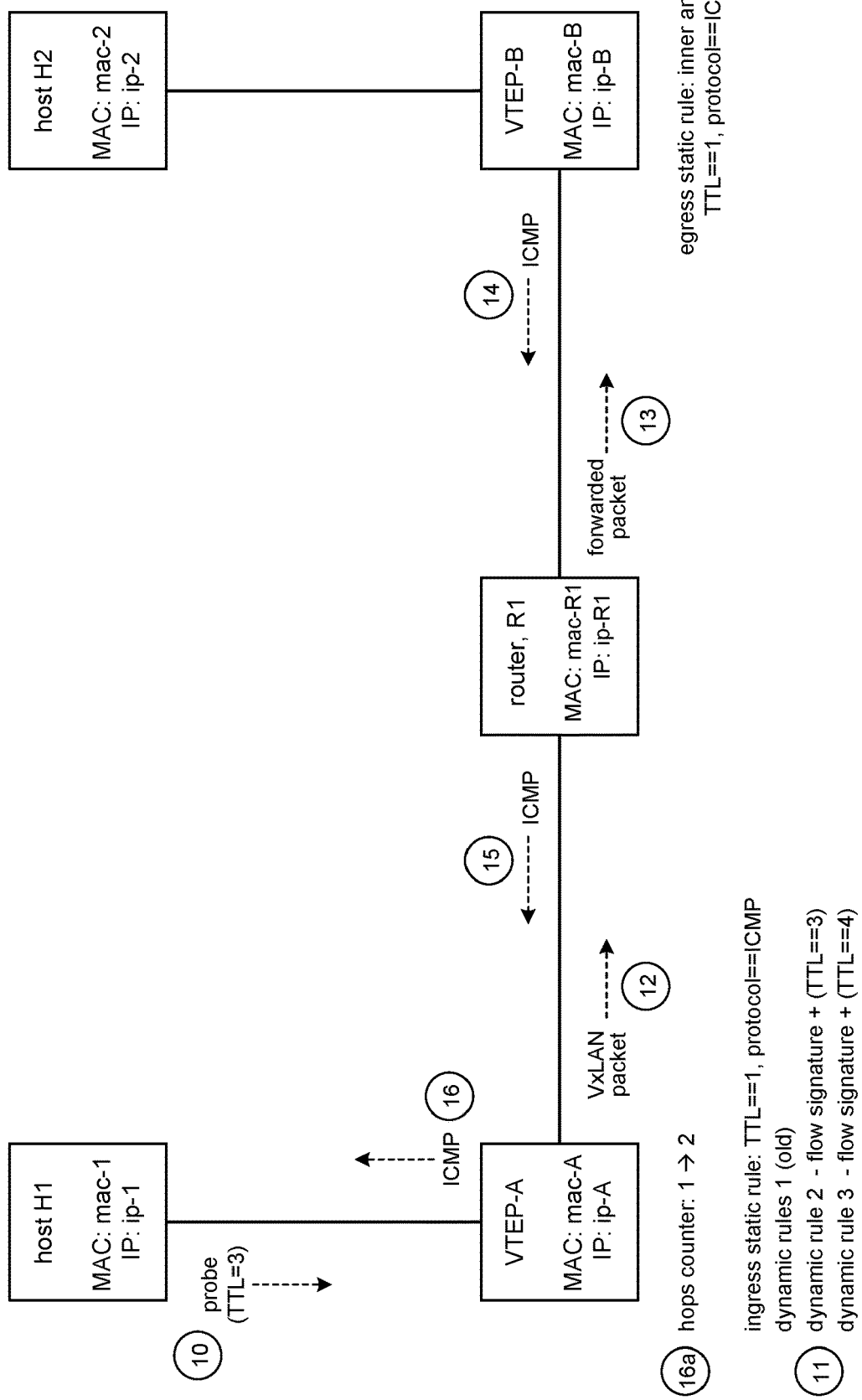

Referring to FIG. 5C, host H1 sends a subsequent traceroute probe from H1 to (destination) host H2, including incrementing the TTL to '3' in order to reach the next hop, namely VTEP-B:
 probe: SMAC=mac-1, DMAC=mac-2, SIP=ip-1, DIP=ip-2, TTL=3, prot=ICMP Time Index 11

VTEP-A receives the traceroute probe from H1, which per the flow of operations in FIG. 4 is processed at operation 426. Because the probe does not trigger the static egress traceroute trap rule in VTEP-A processing proceeds to operation 432. A match occurs with dynamic rule 2 and so processing proceeds along the Y branch of operation 432 to FIG. 4D, where at operation 492 VTEP-A updates dynamic rule 2 by incrementing the TTL match criterion to TTL==4, and installs the updated rule (creates dynamic rule 3) to trap the next probe in the traceroute session. Dynamic rule 3 includes the following match criteria:
 SIP==ip-1, DIP==ip-2, to match packets sourced from H1 and directed to H2
 prot==ICMP, ICMP ID==id-1 to match packets of a given traceroute session
 TTL==4, to match the next traceroute probe in the given traceroute session Dynamic Rule 3 (Flow Signature)

Dynamic rules 1-2 will or will have been aged out per operation 484, FIG. 4C.

Time Index 12

Per operation 494 in FIG. 4D, the traceroute probe is encapsulated in a VxLAN packet. The traceroute probe becomes the payload of an inner IP datagram (FIG. 2C). The TTL of the probe is referred to as the inner TTL (which at this time is '3'), and the TTL of the encapsulating packet is referred to as the outer TTL. As discussed above, the inner TTL and outer TTL are computed according to the sequence, where inner TTL is '3' and hops counter is '1':
 inner TTL←inner TTL−1
 outer TTL←inner TTL
 inner TTL←inner TTL−hops counter The following VxLAN packet is generated and forwarded to router R1:
 VxLAN packet: SMAC=mac-A, DMAC=mac-R1, SIP=ip-A, DIP=ip-B, (outer) TTL=2, prot=VxLAN, <probe>
  probe: SMAC=mac-1, DMAC=mac-2, SIP=ip-1, DIP=ip-2, (inner) TTL=1, prot=ICMP where the (inner) TTL value of the probe has been updated according to the above computation sequence.

Time Index 13

The VxLAN packet is received by router R1 as a regular packet, so the received packet appears to the router as:
 received packet: SMAC=mac-A, DMAC=mac-R1, SIP=ip-A, DIP=ip-B, TTL=2, prot=VxLAN, <payload> where <payload> is the traceroute probe with its (inner) TTL value of '1'. When the router decrements the TTL in the received packet, per conventional router processing operations, a TTL timeout does not occur (because the result is TTL==1) and router R1 forwards the received packet to the next hop device, namely VTEP-B, as follows:
 forwarded packet: SMAC=mac-R1, DMAC=mac-B, SIP=ip-A, DIP=ip-B, TTL=1, prot=VxLAN, <payload>
  payload: SMAC=mac-1, DMAC=mac-2, SIP=ip-1, DIP=ip-2, (inner) TTL=1, prot=ICMP noting that the TTL in the forwarded packet is now '1'.
Time Index 14

VTEP-B receives the forwarded packet from router R1, which per the flow in FIG. 4 proceeds along the Y branch of operation 412 to FIG. 4B because the self MAC and self IP criteria have been met and the forwarded packet is of type VxLAN. VTEP-B operates as an egress VTEP to processes the packet received from router R1 as a VxLAN packet:

VxLAN packet: [outer] SMAC=mac-R1, DMAC=mac-B, SIP=ip-A, DIP=ip-B, TTL=1, prot=VxLAN, <payload>
    payload: [inner] SMAC=mac-1, DMAC=mac-2, SIP=ip-1, DIP=ip-2, TTL=1, prot=ICMP Per operation 462 in FIG. 4B, it can be seen that the VxLAN packet triggers a static egress traceroute trap rule in VTEP-B, namely:

(egress) static traceroute trap rule: outer TTL==1, inner TTL==1, prot=ICMP

Accordingly, processing proceeds along the Y branch of operation 462 to operation 466, and proceeds from operation 466 along the N branch to operation 468 because the inner DMAC (mac-2) does not equal the VTEP self mac (mac-B), to process a TTL timeout. At operation 468 VTEP-B generates the following ICMP "Time Exceeded" message:

ICMP message: SMAC=mac-B, DMAC=mac-R1, SIP=ip-B, DIP=ip-A, TTL=64, prot=ICMP, <ICMP payload> where <ICMP payload> is the received VxLAN packet with the encapsulated traceroute probe. The ICMP message is then routed via router R1 to VTEP-A in accordance with standard routing semantics.
Time Index 15

Router R1 receives the ICMP message, and per conventional routing semantics routes the packet to VTEP-A.
Time Index 16

VTEP-A receives the ICMP message from router R1 (upstream device). VTEP-A can process the received ICMP message in the same manner as described at time index 8 to generate a new ICMP message that is sent to host H1. The generated ICMP message is received and processed by host H1, thus completing the third round of the traceroute session. Host H1 has detected the following hops: VTEP-A, router R1, and VTEP-B.
Time Index 16a The hops counter is incremented (448, FIG. 4A) from '1' to '2' to reflect the detection of an underlay router, namely router R1. The operations at time indices 16 and 16a enable uniform TTL processing in accordance with the present disclosure. The ICMP "Time Exceeded" messages that are directed to VTEP-A allow VTEP-A to detect and track underlay router. Because VTEP-A generates a new ICMP message that is sent to host H1, the traceroute session is sustained despite the ICMP "Time Exceeded" message being directed to and processed by VTEP-A.
Time Index 17

Figure 5D:
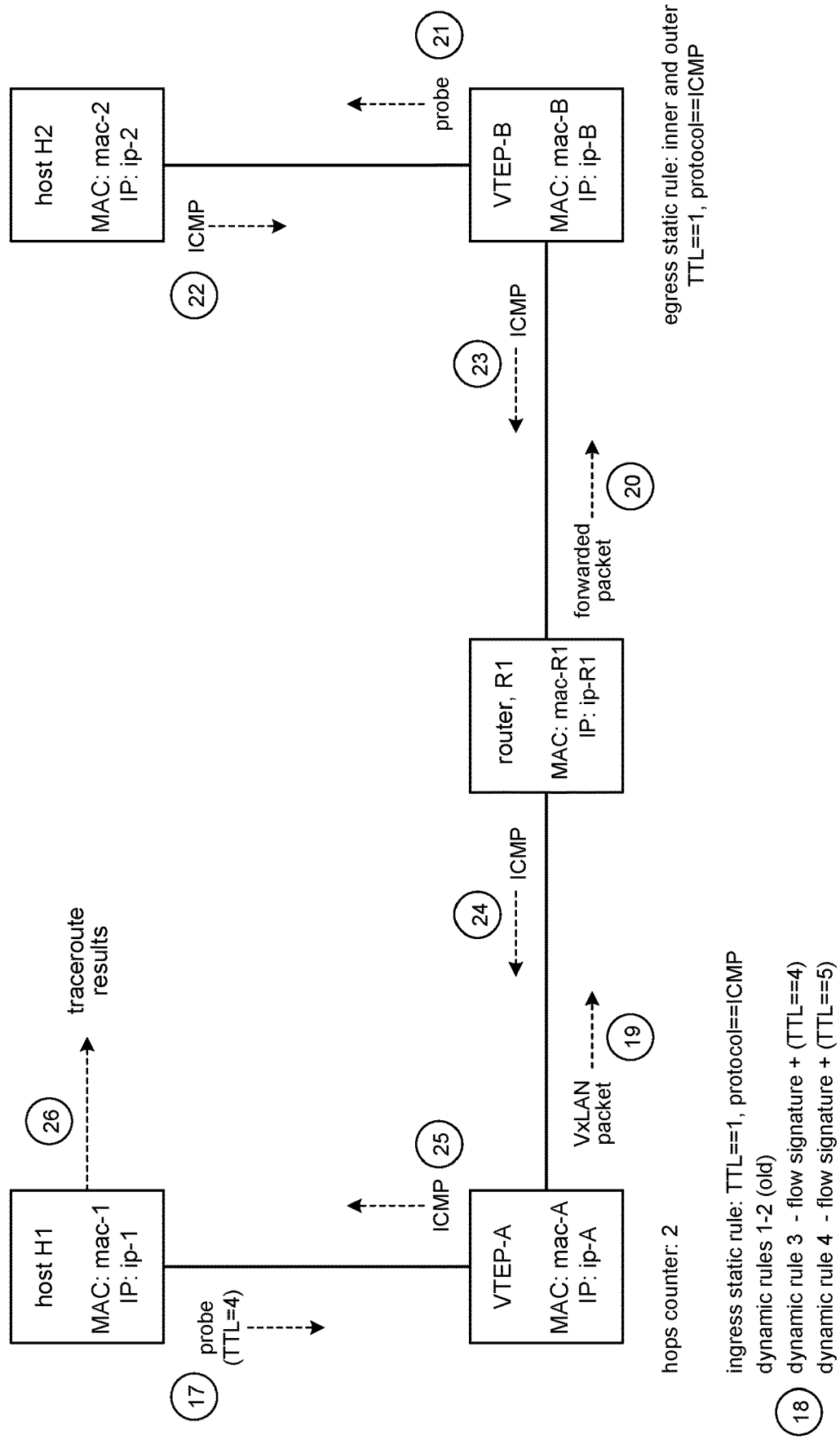

Referring to FIG. 5D, host H1 sends a subsequent traceroute probe from H1 to (destination) host H2, including incrementing the TTL to '4' in order to reach the next hop:
    probe: SMAC=mac-1, DMAC=mac-2, SIP=ip-1, DIP=ip-2, TTL=4, prot=ICMP Time Index 18

VTEP-A receives the next traceroute probe, which per the flow of operations in FIG. 4 is processed at operation 426. The probe does not trigger the static ingress traceroute trap rule in VTEP-A and so processing proceeds to operation 432. A match, however, occurs with dynamic rule 3 (because TTL-4) and so processing proceeds along the Y branch of operation 432 to FIG. 4D, where VTEP-A updates dynamic rule 3 by incrementing the TTL match criterion to TTL==5, and installs the updated rule (creates dynamic rule 4) to trap the next probe in the traceroute session. Dynamic rule 4 includes the following match criteria:

SIP==ip-1, DIP==ip-2, to match packets sourced from H1 and directed to H2 prot==ICMP, ICMP ID==id-1 to match packets of a given traceroute session

TTL==5, to match the next traceroute probe in the given traceroute session

Dynamic Rule 4 (Flow Signature)

Dynamic rules 1-3 are no longer needed and will have been or will be aged out per operation 484, FIG. 4C.
Time Index 19

Per operation 494 in FIG. 4D, the traceroute probe is encapsulated in a VxLAN packet. The traceroute probe becomes the payload of an inner IP datagram (FIG. 2C). The TTL of the probe is referred to as the inner TTL, and the TTL of the encapsulating packet is referred to as the outer TTL. The inner TTL in the traceroute probe at this time is '4' and the hops counter is '2' indicating that underlay routers router R1 and VTEP-B have been detected. As discussed above, the inner TTL and outer TTL are computed according to the sequence, where inner TTL is '4' and hops counter is '2':
    inner TTL←inner TTL−1
    outer TTL←inner TTL
    inner TTL←inner TTL−hops counter The following VxLAN packet is generated and forwarded to router R1:

VxLAN packet: SMAC=mac-A, DMAC=mac-R1, SIP=ip-A, DIP=ip-B, (outer) TTL=3, prot=VxLAN, <probe>
    probe: SMAC=mac-1, DMAC=mac-2, SIP=ip-1, DIP=ip-2, (inner) TTL=1, prot=ICMP where the (inner) TTL value of the probe is updated to '1'.
Time Index 20

The VxLAN packet is received by router R1 as a regular packet, so the received packet appears to the router as:
    received packet: SMAC=mac-A, DMAC=mac-R1, SIP=ip-A, DIP=ip-B, TTL=3, prot=VxLAN, <payload> where <payload> is the traceroute probe with its updated (inner) TTL value of 1'. When the router decrements the TTL in the received packet, per conventional router processing operations, a TTL timeout does not occur (because the result is TTL==2) and router R1 forwards the received packet to the next hop device, namely VTEP-B with:
    forwarded packet: SMAC=mac-R1, DMAC=mac-B, SIP=ip-A, DIP=ip-B, TTL=2, prot=VxLAN, <payload> noting that the TTL in the forwarded packet is now '2'.
Time Index 21 (FIG. 5D)

VTEP-B receives the forwarded packet from router R1, which per the flow in FIG. 4 proceeds along the Y branch of operation 412 to FIG. 4B because the self MAC and self IP criteria have been met and the forwarded packet is of type VxLAN, the forwarded packet is deemed to be a VxLAN packet:

VxLAN packet: [outer] SMAC=mac-R1, DMAC=mac-B, SIP=ip-A, DIP=ip-B, TTL=2, prot=VxLAN, <payload>
    payload: [inner] SMAC=mac-1, DMAC=mac-2, SIP=ip-1, DIP=ip-2, TTL=1, prot=ICMP Accordingly, VTEP-B operates as an egress VTEP to process the received VxLAN packet. It can be seen that this VxLAN packet does not trigger the static egress traceroute trap rule in VTEP-B because the inner and outer TTLs are not both equal to '1', and so processing in FIG. 4B proceeds to operation 464, where VTEP-B processes the received VxLAN packet according to regular forwarding semantics. For example, the VxLAN packet is decapsulated to recover the encapsulated traceroute probe with its TTL value being '1':

probe: SMAC=mac-1, DMAC=mac-2, SIP=ip-1, DIP=ip-2, TTL=1, prot=ICMP

Because host H1 and H2 are on the same network, the probe is bridged and so VTEP-B simply transmits the probe on the port to which H2 is connected. Note the probe is being bridged according to regular forwarding semantics, so VTEP-B does not generate an ICMP "Time Exceeded" message despite that TTL is '1'.

Time Indices 22-26 (FIG. 5D)

At time index 22, host H2 receives the traceroute probe from host H1, and as explained above in connection with FIG. 3 responds to H1 with an ICMP Echo Reply:

ICMP message: SMAC=mac-2, DMAC=mac-1, SIP=ip-2, DIP=ip-1, <ICMP payload> that is sent back to VTEP-B. Beginning with VTEP-B, the ICMP message is delivered to host H1 according to regular forwarding semantics in all the switches between H2 and H1. More specifically, at time index 23 VTEP-B receives the ICMP message and delivers the message to host H1 according to normal VxLAN bridging semantics, including encapsulating the message in a VxLAN packet and transmitting the VxLAN packet to router R1. At time index 24, router R1 routes the encapsulated ICMP message to VTEP-A using standard forwarding semantics for a router. At time index 25, VTEP-A receives the encapsulated ICMP message from router R1 and, pursuant to normal VxLAN bridging semantics, decapsulates the message and forwards the recovered message to host H1. The ICMP message is received and processed by host H1, thus completing the fourth round of the traceroute session. The ICMP message, being an ICMP Echo Reply message, also concludes the traceroute session for host H1. Host H1 has detected the following hops: VTEP-A, router R1, VTEP-B, and host H2. At time index 26, host H1 can report the results of the traceroute session, log the results, and so on. The traceroute session can be deemed complete.

The discussion will now turn to processing a traceroute session in another VxLAN configuration to provide uniform TTL processing in accordance with the present disclosure.

Configuration 2

Figure 6A:
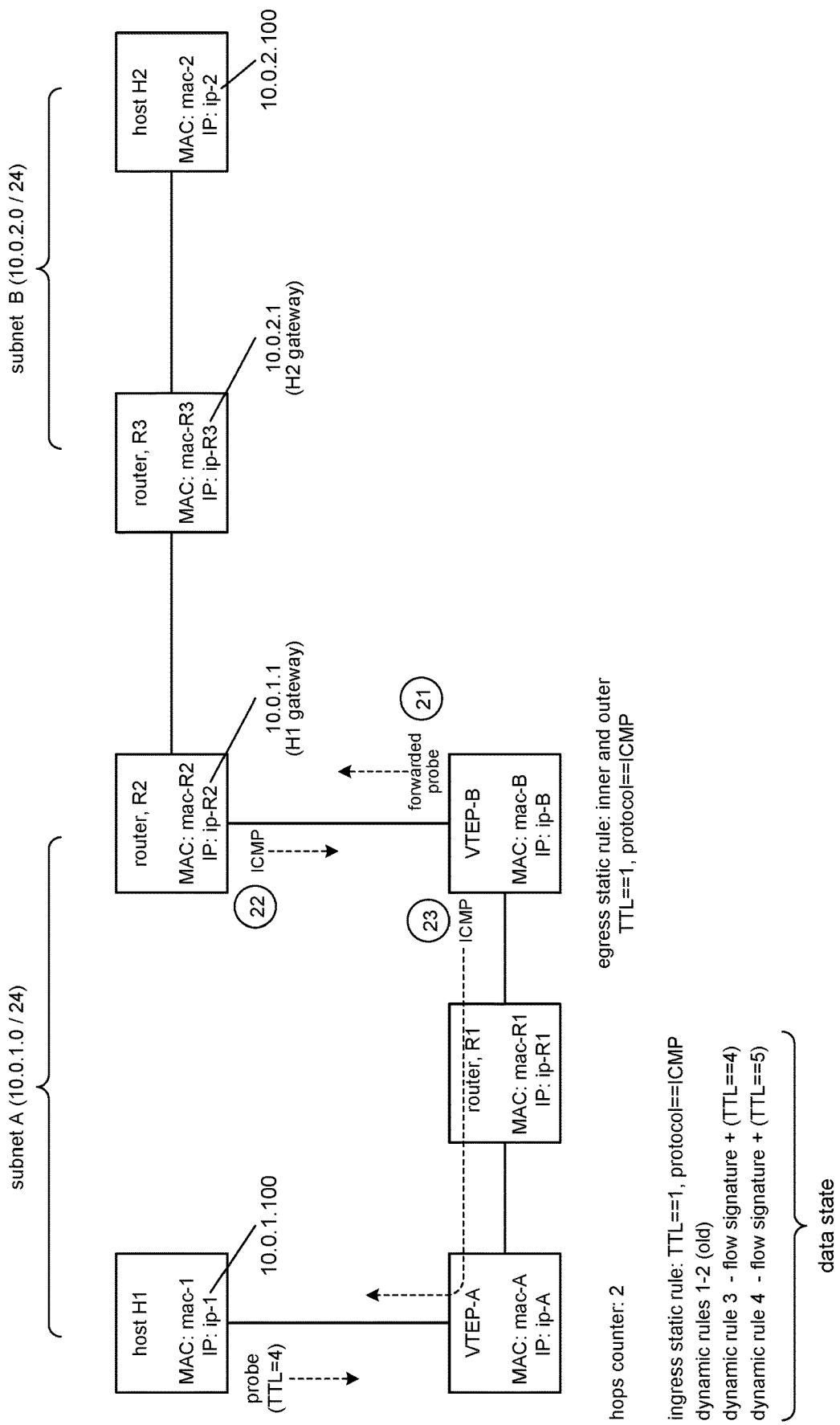
FIGS. 6A, 6B, 6C demonstrate a traceroute sequence in a second illustrative overlay configuration in accordance with some embodiments.
Figure 6B:
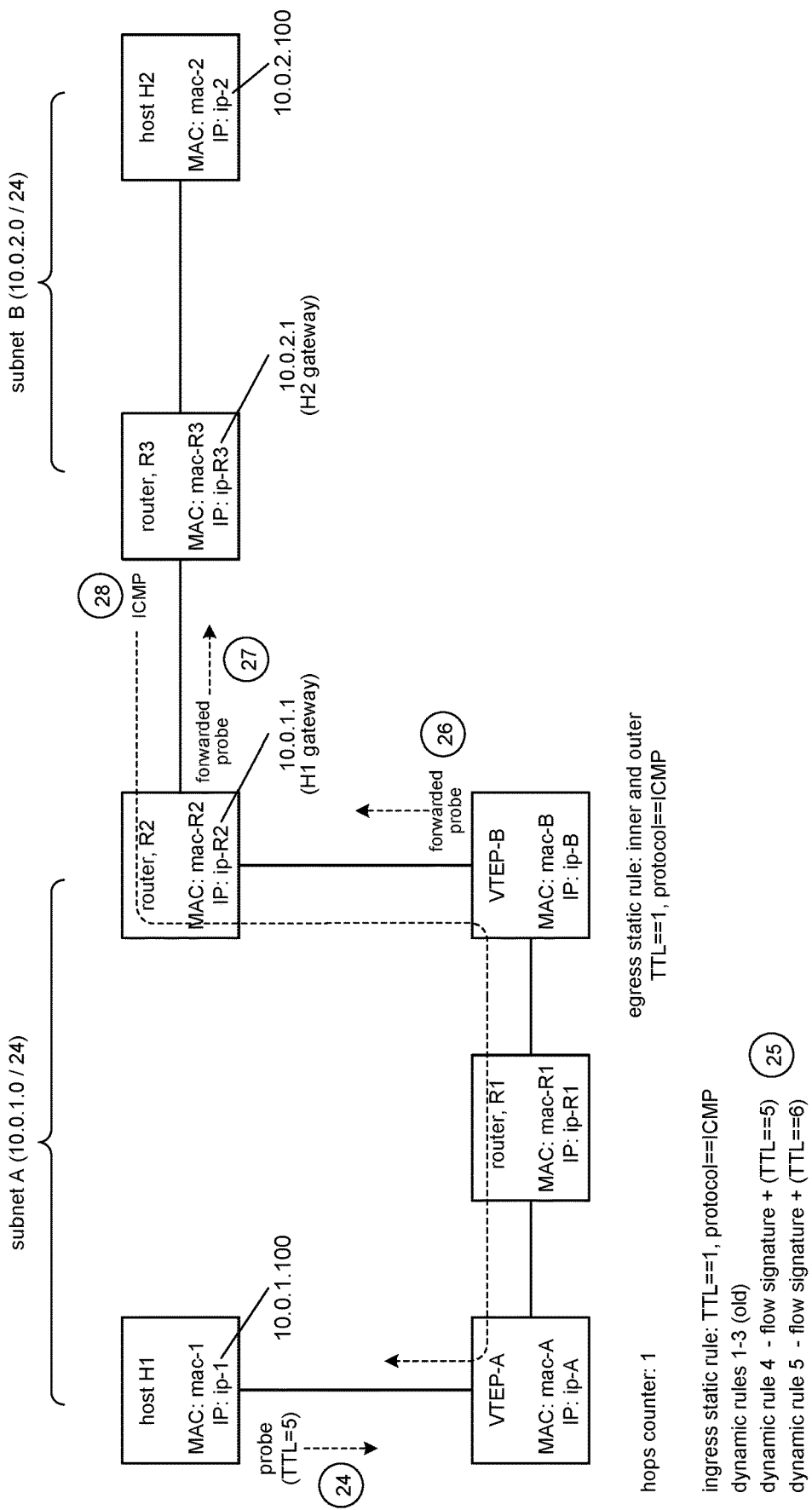
Figure 6C:
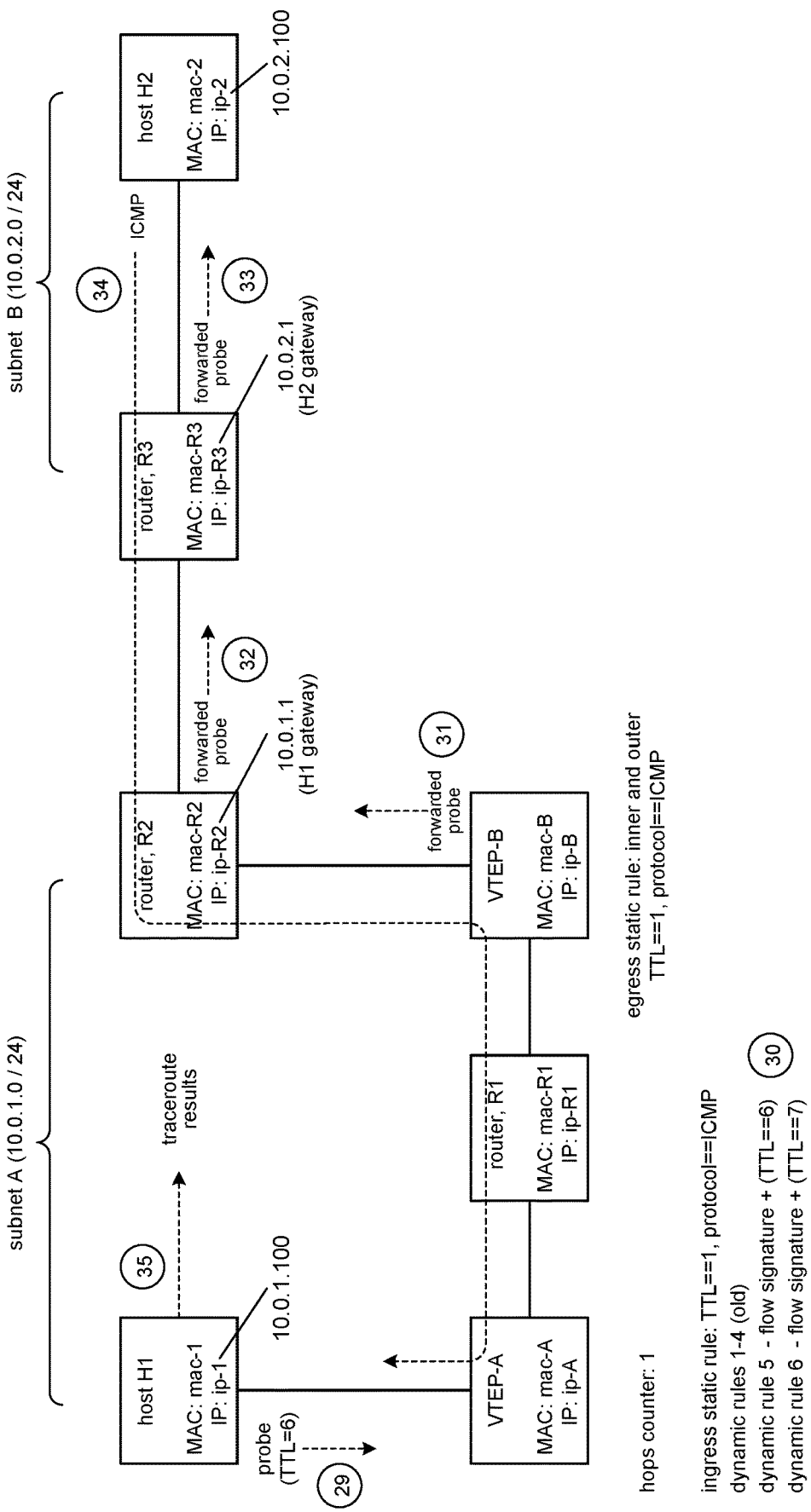

FIGS. 6A-6C illustrate a traceroute session in an L2 overlay (VxLAN) that is part of a larger network that is divided into smaller different subnets. The VxLAN overlay comprises endpoints VTEP-A, VTEP-B with a single router R1 (underlay router) between the VTEPs. Host H1 is in one subnet A (network address: 10.0.1.0/24) and host H2 is in another subnet B (network address: 10.0.2.0/24). Routers R2 and R3 are respective gateways for subnet A and subnet B. More specifically, the default gateway for host H1 is hosted in router R2 and the default gateway for host H2 is hosted in router R3. To illustrate the two subnets for example, FIG. 6A shows that the IP address for host H1 is 10.0.1.100 and the IP address for host H2 is 10.0.2.100. Accordingly, the IP address for router R2 (H1's default gateway) may be 10.0.1.1 and the IP address for router R3 (H2's default gateway) may be 10.0.2.1.

As an initial matter, because host H1 and host H2 are in different subnets, H1 will transmit traceroute packets to H2 via H1's default gateway, namely router R2. As such, traceroute probe packets transmitted by H1 to H2 will have the general form:

probe: SMAC=mac-1, DMAC=mac-R2, SIP=ip-1, DIP=ip-2, TTL=x, prot=ICMP where the destination MAC address is mac-R2 H1's default gateway.

FIG. 6A shows a traceroute session already in progress, where host H1 has already sent out the first three traceroute probes. It can be seen that processing of the first three traceroute probes is described in FIGS. 5A-5C, where after having completed three rounds of the traceroute session host H1 has detected the following hops: VTEP-A, router R1, and VTEP-B.

In FIG. 6A, the fourth traceroute probe (TTL=4) is in progress and has reached VTEP-B, which corresponds to time index 20 shown in FIG. 5D where the probe is transmitted from router R1 to VTEP-B. The starting time index for the configuration shown in FIG. 6A is therefore time index 20, where VTEP-B receives the following forwarded packet from router R1:

forwarded packet: SMAC=mac-R1, DMAC=mac-B, SIP=ip-A, DIP=ip-B, TTL=2, prot=VxLAN, <payload> payload: SMAC=mac-1, DMAC=mac-R2, SIP=ip-1, DIP=ip-2, TTL=1, prot=ICMP where the payload is the traceroute probe, noting that the destination MAC is mac-R2, host H1's gateway. The data state of VTEP-A in FIG. 6A is as shown in FIG. 5D.

Time Index 21 (FIG. 6A)

VTEP-B receives the forwarded packet from router R1. It can be seen that processing per the flow in FIG. 4 proceeds along 406, 408, 410, and 412 to FIG. 4B where the forwarded packet is processed as a VxLAN packet:

VxLAN packet: [outer] SMAC=mac-R1, DMAC=mac-B, SIP=ip-A, DIP=ip-B, TTL=2, prot=VxLAN, <payload> payload: [inner] SMAC=mac-1, DMAC=mac-R2, SIP=ip-1, DIP=ip-2, TTL=1, prot=ICMP

Accordingly, VTEP-B operates as an egress VTEP to process the received VxLAN packet. It can be seen that this VxLAN packet does not trigger the static egress traceroute trap rule (operation 462) in VTEP-B because the inner and outer TTLs are not both equal to '1', and so processing in FIG. 4B proceeds to operation 464, where VTEP-B processes the received VxLAN packet according to regular forwarding semantics, including decapsulating the VxLAN packet to recover the encapsulated payload shown above. Further, per regular forwarding semantics, VTEP-B forwards the decapsulated payload, which is the traceroute probe, according to the destination MAC address in the probe. The MAC address is mac-R2 (router R2), and so the probe is forwarded to router R2 as:

forwarded probe: SMAC=mac-1, DMAC=mac-R2, SIP=ip-1, DIP=ip-2, TTL=1, prot=ICMP

Note, because the probe is bridged, VTEP-B does not generate an ICMP "Time Exceeded" message despite that TTL is '1'.

Time Index 22 (FIG. 6A)

Router R2 processes the forwarded probe received from VTEP-B in accordance with standard routing semantics, which includes decrementing the TTL. We see that the TTL becomes '0' and so router R2 generates the following ICMP "Time Exceeded" message:

ICMP message: SMAC=mac-R2, DMAC=mac-1, SIP=ip-R2, DIP=ip-1, <ICMP payload> where <ICMP payload> is the forwarded probe received from VTEP-B, shown above. Although not shown, the TTL in the ICMP message is set to a default value (e.g., TTL=64) that is standard for IP datagrams. Router R2 transmits the ICMP message to VTEP-B.

Time Index 23 (FIG. 6A)

VTEP-B receives the ICMP message from router R2 and processing proceeds per FIG. 4 through operations 406, 422, 426, 432, and 434, where at operation 434 the received message is delivered to host H1 according to regular forwarding semantics in all the switches. More specifically, VTEP-B delivers the message to host H1 according to normal VxLAN bridging semantics, including encapsulating the message in a VxLAN packet and transmitting the VxLAN packet to router R1. Router R1 forwards the encapsulated ICMP message on to VTEP-A using standard forwarding semantics for a router. VTEP-A processes the encapsulated ICMP message from router R1 pursuant to normal VxLAN bridging semantics, including decapsulating the message and forwarding the recovered message to host H1. Host H1 can process the received ICMP "Time Exceeded" message, thus completing the fourth round of the traceroute session. Host H1 has detected the following hops: VTEP-A, router R1, VTEP-B, and router R2.

Time Index 24 (FIG. 6B)

Referring to FIG. 6B, host H1 sends the next traceroute probe from H1 to (destination) host H2, including incrementing the TTL to '5' in order to reach the next hop, namely router R3:

probe: SMAC=mac-1, DMAC=mac-R2, SIP=ip-1, DIP=ip-2, TTL=5, prot=ICMP

Time Index 25 (FIG. 6B)

VTEP-A receives the traceroute probe, and as explained in the examples above, the received probe triggers dynamic rule 4 (TTL-5) in the VTEP. Dynamic rule 4 is updated (creates dynamic rule 5) with TTL==6 to capture the next traceroute probe.

VTEP-A encapsulates the received probe in a VxLAN packet, including computing the inner and outer TTL values according to the sequence, where inner TTL is '5' and hops counter is '2' inner TTL←inner TTL−1
outer TTL←inner TTL
inner TTL←inner TTL−hops counter

VTEP-A forwards the resulting VxLAN packet to VTEP-B via router R1:

VxLAN packet: SMAC=mac-A, DMAC=mac-R1, SIP=ip-A, DIP=ip-B, (outer) TTL=4, prot=VxLAN, <probe>
probe: SMAC=mac-1, DMAC=mac-R2, SIP=ip-1, DIP=ip-2, (inner) TTL=2, prot=ICMP Time Index 26 (FIG. 6B)

VTEP-B receives the above VxLAN packet from router R1. Processing proceeds as explained above at time index 21. VTEP-B operates as an egress VTEP processes the received VxLAN packet at operation 464 (FIG. 4B) according to regular forwarding semantics, including decapsulating the VxLAN packet to recover the encapsulated probe and forwarding the probe to router R2 as follows:

forwarded probe: SMAC=mac-1, DMAC=mac-R2, SIP=ip-1, DIP=ip-2, TTL=2, prot=ICMP

Time Index 27 (FIG. 6B)

Router R2 processes the received probe in accordance with standard conventional routing procedures. For example, router R2 decrements TTL in the received probe (result is TTL=1) and forwards the probe to router R3 because TTL is still greater than '0':

forwarded probe: SMAC=mac-R2, DMAC=mac-R3, SIP=ip-1, DIP=ip-2, TTL=1, prot=ICMP

Time Index 28 (FIG. 6B)

Router R3 processes the forwarded probe received from router R2, and per standard conventional router operations generates an ICMP "Time Exceeded" message because decrementing the TTL results in TTL=0:

ICMP message: SMAC=mac-R3, DMAC=mac-R2, SIP=ip-R3, DIP=ip-1, <ICMP payload> where <ICMP payload> is the forwarded probe received from router R2:

forwarded probe: SMAC=mac-R2, DMAC=mac-R3, SIP=ip-1, DIP=ip-2, TTL=1, prot=ICMP

Although not shown, the TTL in the ICMP message is set to a default value (e.g., TTL=64) that is standard for IP datagrams.

Router R2 the sends the ICMP message back to VTEP-B according to standard conventional routing operations. VTEP-B receives the ICMP message and sends the message to host H1 in accordance with standard conventional VxLAN bridging operations, as explained for example in connection with FIG. 6A at time index 23. Host H1 can process the received ICMP "Time Exceeded" message, thus completing the fifth round of the traceroute session. Host H1 has detected the following hops: VTEP-A, router R1, VTEP-B, router R2, and router R3.

Time Index 29 (FIG. 6C)

Referring to FIG. 6C, host H1 sends the next traceroute probe from H1 to (destination) host H2, including incrementing the TTL to '6' in order to reach the next hop, namely host H2:

probe: SMAC=mac-1, DMAC=mac-R2, SIP=ip-1, DIP=ip-2, TTL=6, prot=ICMP

Time Index 30 (FIG. 6C)

VTEP-A receives the traceroute probe, and as explained above, the received probe triggers dynamic rule 5 (TTL==6) in the VTEP. Dynamic rule 5 is updated (creates dynamic rule 6) with TTL==7 to capture the next traceroute probe.

VTEP-A encapsulates the received probe in a VxLAN packet, including computing the inner and outer TTL values according to the sequence, where inner TTL is '6' and hops counter is '2' inner TTL←inner TTL−1
outer TTL←inner TTL
inner TTL←inner TTL−hops counter

VTEP-A forwards the resulting VxLAN packet to VTEP-B via router R1:

VxLAN packet: SMAC=mac-A, DMAC=mac-R1, SIP=ip-A, DIP=ip-B, (outer) TTL=5, prot=VxLAN, <probe>
probe: SMAC=mac-1, DMAC=mac-R2, SIP=ip-1, DIP=ip-2, (inner) TTL=3, prot=ICMP Time Index 31 (FIG. 6C)

VTEP-B receives the above VxLAN packet from router R1. Processing proceeds as explained above at time index 21. VTEP-B operates as an egress VTEP processes the received VxLAN packet at operation 464 (FIG. 4B) according to regular forwarding semantics, including decapsulating the VxLAN packet to recover the encapsulated probe and forwarding the probe to router R2 as follows:

forwarded probe: SMAC=mac-1, DMAC=mac-R2, SIP=ip-1, DIP=ip-2, TTL=3, prot=ICMP

Time Index 32 (FIG. 6C)

Router R2 processes the received probe in accordance with standard conventional routing procedure. For example, router R2 decrements TTL in the received probe (result is TTL=2) and forwards the probe to router R3 because TTL is still greater than '0':

forwarded probe: SMAC=mac-R2, DMAC=mac-R3, SIP=ip-1, DIP=ip-2, TTL=2, prot=ICMP

Time Index 33 (FIG. 6C)

Router R3 processes the received probe in accordance with standard conventional routing procedure, including decrementing TTL in the received probe (result is TTL=1) and forwards the probe to host H2:

forwarded probe: SMAC=mac-R3, DMAC=mac-2, SIP=ip-1, DIP=ip-2, TTL=1, prot=ICMP

Time Indices 34 and 35 (FIG. 6C)

At time index 34, host H2 receives the traceroute probe from host H1, and as explained above in connection with FIG. 3 responds to H1 with an ICMP "Echo Reply" message:

ICMP message: SMAC=mac-2, DMAC=mac-R3, SIP=ip-2, DIP=ip-1, <ICMP payload> that is sent to H2's default gateway router R3. Beginning with router R3, the ICMP message is delivered to host H1 according to regular forwarding semantics in all the switches between H2 and H1 as explained, for example, in connection with time indices 22-26 in FIG. 5D. Host H1 receives and processes the ICMP message, thus completing the sixth round of the traceroute session. The ICMP message, being an ICMP Echo Reply message, also concludes the traceroute session for host H1. Host H1 has detected the following hops: VTEP-A, router R1, VTEP-B, router R2, router R3. and host H2. At time index 35, host H1 can report the results of the traceroute session, log the results, and so on. The traceroute session can be deemed complete.

The discussion will now turn to processing a traceroute session in another VxLAN configuration to provide uniform TTL processing in accordance with the present disclosure.

Configuration 3

Figure 7:
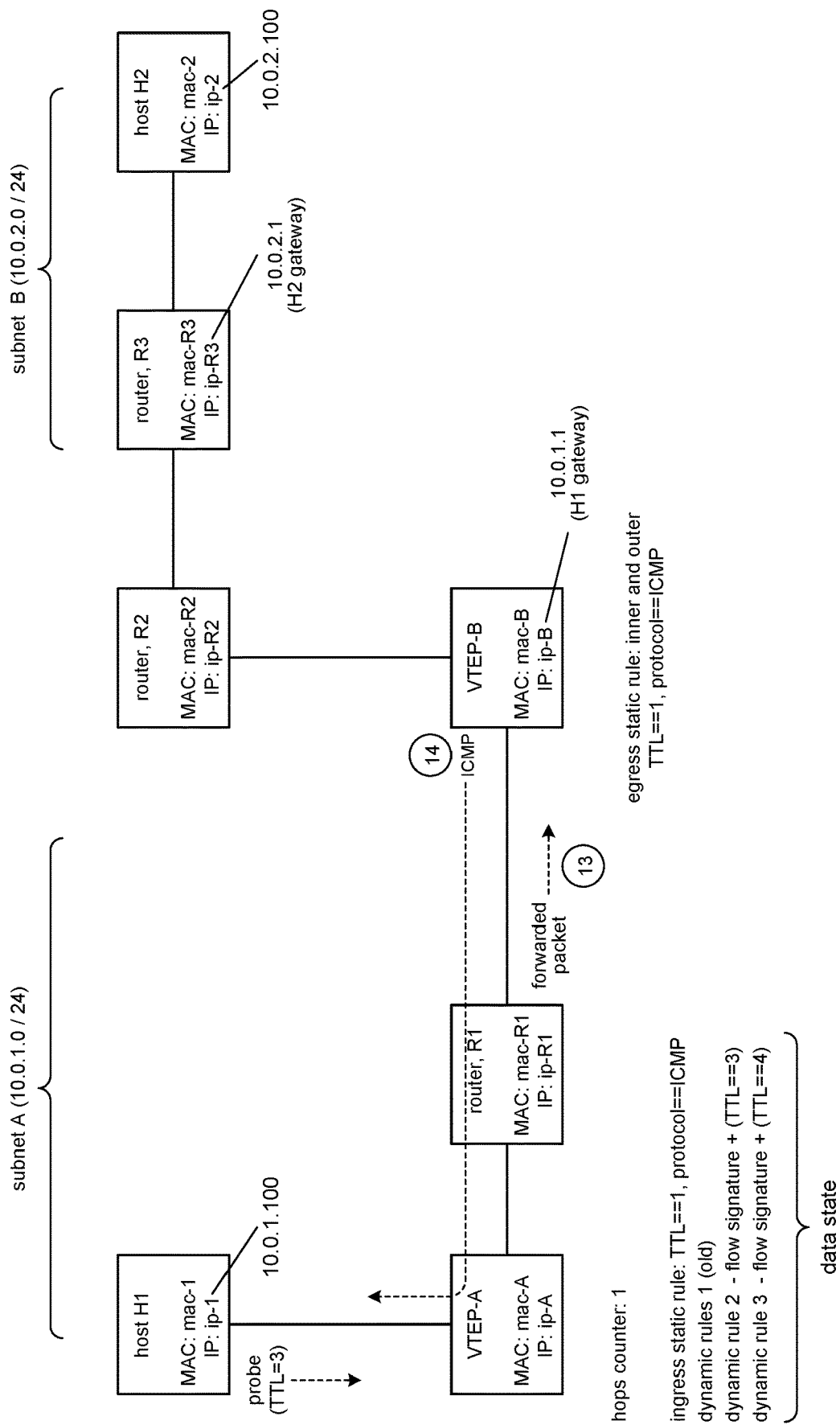
FIG. 7 shows a third illustrative configuration for processing traceroute packets in accordance with some embodiments.

FIG. 7 illustrates a traceroute session in a variant of the configuration illustrated in FIGS. 6A-6C where VTEP-B itself serves as the default gateway for host H1, rather than router R2 as shown in FIGS. 6A-6C. Because H1 and H2 are in different subnets, H1 will transmit traceroute packets to H2 via H1's default gateway, VTEP-B. As such, traceroute probe packets transmitted by H1 to H2 will have the general form:

probe: SMAC=mac-1, DMAC=mac-B, SIP=ip-1, DIP=ip-2, TTL=x, prot=ICMP where the destination MAC address is mac-B, H1's default gateway.

FIG. 7 shows a traceroute session already in progress, where host H1 has already sent out the first two traceroute probes. It can be seen that processing of the first two traceroute probes is described in FIGS. 5A-5B, where after having completed two rounds of the traceroute session host H1 has detected the following hops: VTEP-A and router R1.

In FIG. 7, the third traceroute probe (TTL=3) is in progress and has reached VTEP-B, which corresponds to time index 13 shown in FIG. 5C, where the probe is transmitted from router R1 to VTEP-B. The starting time index for the configuration shown in FIG. 7 is therefore time index 13, where VTEP-B receives the following forwarded packet from router R1:

forwarded packet: SMAC=mac-R1, DMAC=mac-B, SIP=ip-A, DIP=ip-B, TTL=1, prot=VxLAN, <payload> payload: [inner] SMAC=mac-1, DMAC=mac-B, SIP=ip-1, DIP=ip-2, TTL=1, prot=ICMP where the payload is the traceroute probe, noting that the destination MAC is mac-B, host H1's gateway. The data state of VTEP-A in FIG. 7 is as shown in FIG. 5C. Notably, the hops counter at time index 13 is '1' because the counter has not yet been incremented at time index 13.

Time Index 14 (FIG. 7)

VTEP-B receives the forwarded packet from router R1. It can be seen that processing per the flow in FIG. 4 proceeds along 406, 408, 410, and 412 to FIG. 4B where the forwarded packet is processed as a VxLAN packet:

forwarded packet: SMAC=mac-R1, DMAC=mac-B, SIP=ip-A, DIP=ip-B, TTL=1, prot=VxLAN, <payload> payload: [inner] SMAC=mac-1, DMAC=mac-B, SIP=ip-1, DIP=ip-2, TTL=1, prot=ICMP

Per operation 462 in FIG. 4B, it can be seen that the VxLAN packet triggers a static egress traceroute trap rule in VTEP-B, namely:

(egress) static traceroute trap rule: outer TTL==1, inner TTL==1, prot=ICMP

Accordingly, processing proceeds along the Y branch of operation 462 to operation 466, and from operation 466 to operation 470 because the inner DMAC (mac-B) equals the VTEP self mac, to process a TTL timeout. VTEP-B generates the following ICMP "Time Exceeded" message:

ICMP message: SMAC=mac-B, DMAC=mac-1, SIP=ip-B, DIP=ip-1, TTL=64, <ICMP payload> where <ICMP payload> is the payload. The ICMP message is then sent to host H1 in accordance with standard VxLAN forwarding semantics, which includes encapsulating the message in a VxLAN packet that is destined to host H1:

VxLAN packet: SMAC=mac-B, DMAC=mac-R1, SIP=ip-B, DIP=ip-A, TTL=64, prot=VxLAN, <VxLAN payload>

VxLAN payload: [ICMP message] SMAC=mac-B, DMAC=mac-1, SIP=ip-B, DIP=ip-1, TTL=64, <ICMP payload>

ICMP payload: SMAC=mac-1, DMAC=mac-B, SIP=ip-1, DIP=ip-2, TTL=1, prot=ICMP and sending the VxLAN packet to router R1. Router R1 routes the VxLAN packet to VTEP-A. VTEP-A processed the VxLAN packet according to standard VxLAN semantics, including decapsulating the ICMP message and forwarding the decapsulated ICMP message to host H1.

Notably, the hops counter in VTEP-A is not incremented because the ICMP error message from VTEP-B is directly addressed to Host H1. As explained above, the hops counter tracks the number of hops in the overlay, which typically would include VTEP-B. However, when VTEP-B also serves as a gateway, then the hop counter does not count VTEP-B as being a hop in the overlay. It can be seen that the remaining rounds in the traceroute session proceed as described above in connection with FIGS. 5A-5D and 6A-6C.

Configuration 4

Figure 8:
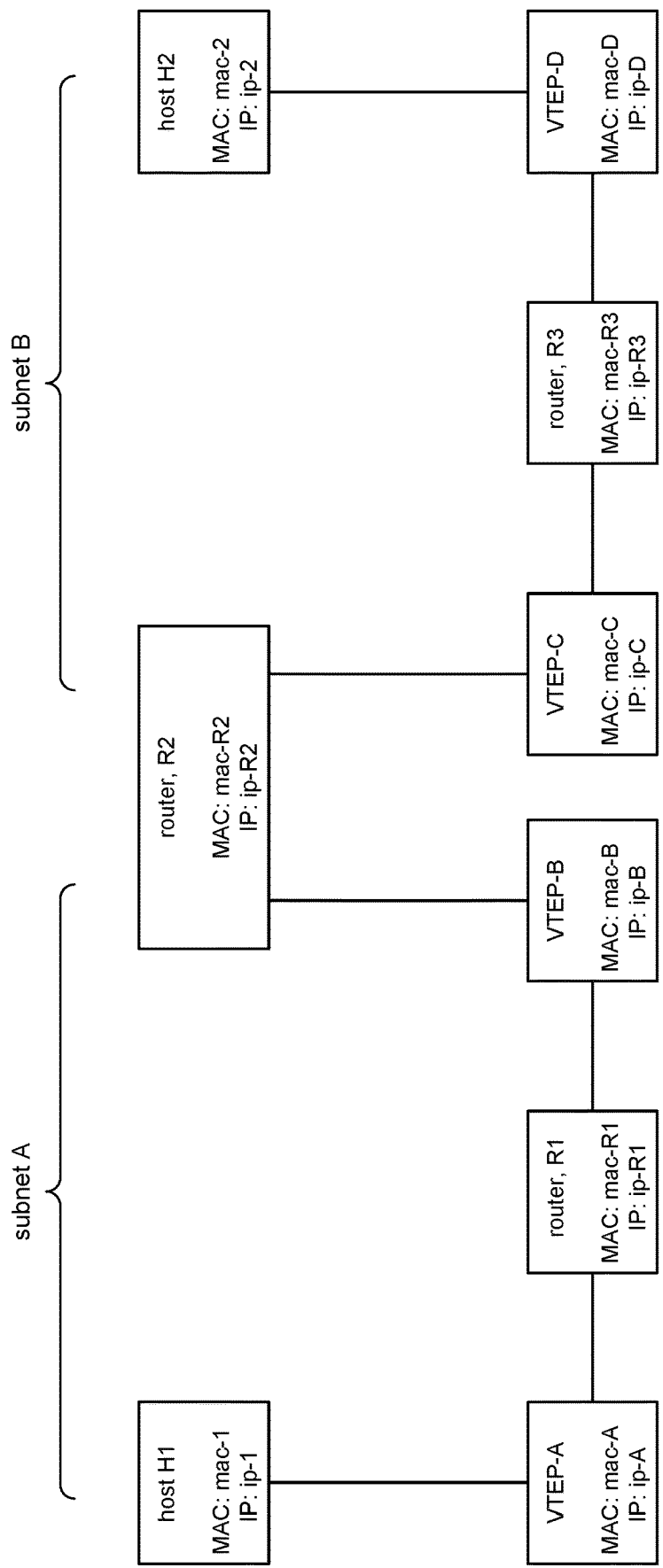
FIG. 8 shows a fourth illustrative configuration for processing traceroute packets in accordance with some embodiments.

FIG. 8 illustrates a configuration that connects host machines H1, H2 across multiple L2 overlays (VxLANs), an overlay bounded by VTEP-A and VTEP-B and another overlay bounded by VTEP-C and VTEP-D. The overlays are in different subnets, subnet A, subnet B. The VTEPs can be configured to process the traceroute probes in accordance with the present disclosure. Gateway router R2 provides access between the subnets and routes packets between VTEP-B and VTEP-C according to standard conventional routing operations.

The processing of a traceroute session between VTEP-A and VTEP-B proceeds as described above in connection with FIGS. 5A-5D. Likewise, processing of the traceroute session between VTEP-C and VTEP-D is the same as for VTEP-A and VTEP-D, respectively, because the traceroute packet exits VTEP-B in decapsulated form and is routed to VTEP-C by router R2 as regular traffic. Accordingly, VTEP-C receives the traceroute probe from router R2 in decapsulated form. VTEP-C serves as an ingress VTEP to encapsulate the traceroute probe received from router R2 (sending computer) and routes the resulting VxLAN packet to VTEP-D as described in FIGS. 5A-5D. Recall from the description of FIG. 4 above, that the YES branch from operation 426 and 418 can indicate VTEP1 (FIG. 1) has received an initial traceroute probe from a host machine for a traceroute session. In the configuration in FIG. 8, the YES branch from operations 426 and 418 by VTEP-C indicates that VTEP-C, as an ingress VTEP, has encountered a traceroute probe in an on-going traceroute session for the first time.

Figure 9:
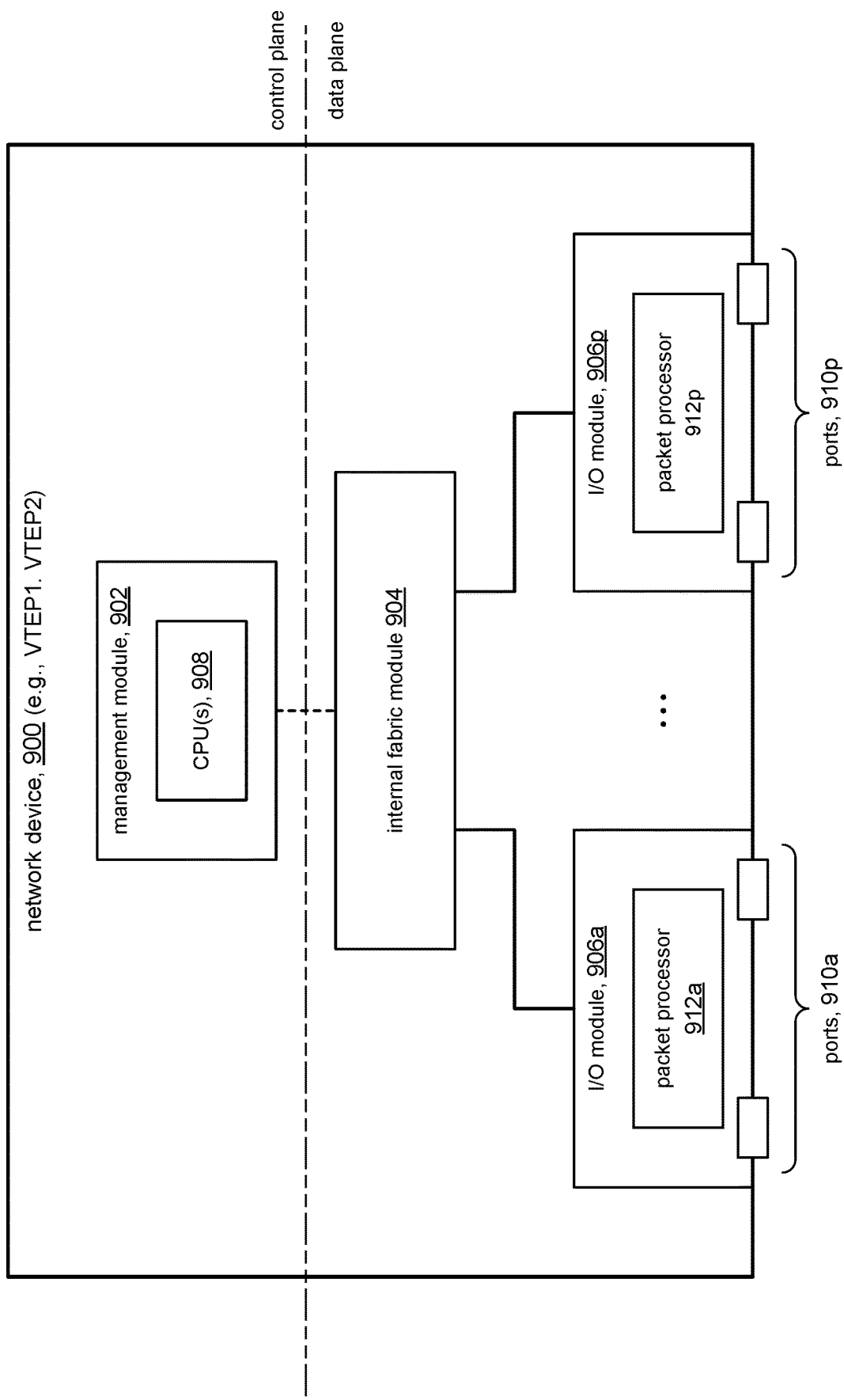
FIG. 9 is a high level block diagram showing components in a network device in accordance with some embodiments.

FIG. 9 depicts an example of a network device 900 in accordance with some embodiments of the present disclosure. In some embodiments, network device 900 can be a switch (e.g., 112, FIG. 1). As shown, network device 900 includes a management module 902, an internal fabric module 904, and a number of I/O modules 906a-906p. Management module 902 includes the control plane (also referred to as control layer) of network device 900 and can include one or more management CPUs 908 for managing and controlling operation of the device. Each management CPU 908 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such a routing protocols, spanning tree, and the like.

Internal fabric module 904 and I/O modules 906a-906p collectively represent the data plane of network device 900 (also referred to as data layer, forwarding plane, etc.). Internal fabric module 904 is configured to interconnect the various other modules of network device 900. Each I/O module 906a-906p includes one or more input/output ports 910a-910p that are used by network device 900 to send and receive network packets. Each I/O module 906a-906p can also include a packet processor 912a-912p. Each packet processor 912a-912p can comprise a hardware processing component (e.g., comprising an ASIC, FPGA, content-addressable memory, and the like) that is configured to make wire speed decisions on how to handle incoming (ingress) and outgoing (egress) network packets. As will become clear, in accordance with some embodiments some aspects of the present disclosure are performed wholly within the data plane.

It should be appreciated that network device 900 is illustrative and many other configurations having more or fewer components than shown in FIG. 9 are possible.

FURTHER EXAMPLES

In accordance with embodiments of the present disclosure, a method in a network device for gathering information about network devices along a path between a sending computer and a receiving computer, includes the network device receiving a stream of ingress packets from the sending computer. The network device can identify a traceroute probe in the stream of ingress packets using a filter that matches for a first time-to-live (TTL) value in the stream of ingress packets and encapsulate the traceroute probe in an egress packet including: decrementing an inner TTL value of the traceroute probe; determining an outer TTL value of the egress packet based on the decremented inner TTL value; and adjusting the decremented inner TTL value by an amount based on a hops counter that indicates a number of network devices along a segment of the path between the sending computer and the receiving computer. The network device can forward the egress packet. The network device can update the filter to match for a second TTL value in the stream of ingress packets to identify a subsequent traceroute probe in the stream of ingress packets.

In some embodiments, the filter matches for a flow signature indicative of the sending computer, in addition to matching the first TTL value, to identify the traceroute probe. In some embodiments, the network device can further detect an initial traceroute probe of a traceroute session and extracting the flow signature from the initial traceroute probe, wherein the flow signature identifies subsequent traceroute probes in the traceroute session. In some embodiments, the filter can include a rule comprising a match criterion that matches for a TTL value of '1' in the stream of ingress packets to identify the initial traceroute probe.

In some embodiments, updating the filter can include adding a rule to the filter to match for the second TTL value.

In some embodiments, the network device can receive a time exceeded message from an upstream device and in response the network device incrementing the hops counter by one. In some embodiments, the network device can increment the hops counter by one only when the network device is the destination of the time exceeded message.

In some embodiments, the network device can receive a time exceeded message from an upstream device that is destined for the network device, and in response generating a new time exceeded message using address information contained in the received time exceeded message and transmitting the new time exceeded message to the sending computer.

In some embodiments, the network devices along the segment of the path between the sending computer and the receiving computer are routers.

In some embodiments, the filter can include a rule to match for an ingress packet having both an outer TTL and an inner TTL value of '1', and in response to the rule matching a received ingress packet from a sending network device, transmit a time exceeded message: to the sending network device when an inner destination media access control (DMAC) address in the received ingress packet is not the same as a MAC address of the network device; and to the sending computer when the inner DMAC in the received ingress packet is the same as the MAC address of the network device.

In accordance with embodiments of the present disclosure, a network device can comprise one or more computer processors; and a computer-readable storage medium comprising instructions for controlling the one or more computer processors to gather information about network devices along a path between a sending computer and a receiving computer, including: identifying a traceroute probe in a stream of ingress packets received from the sending computer using a filter that matches for a first time-to-live (TTL) value in the stream of ingress packets; adjusting a TTL value of the traceroute probe by an amount based on a hops counter that indicates a number of network devices along a segment of the path between the sending computer and the receiving computer; forwarding the traceroute packet having the adjusted TTL value; and updating the filter to match for a second TTL value in the stream of ingress packets to identify a subsequent traceroute probe in the stream of ingress packets.

In some embodiments, the computer-readable storage medium can further comprise instructions for controlling the one or more computer processors to encapsulate the traceroute probe in an egress packet including setting the TTL value of the egress packet based on the TTL value of the traceroute probe. In some embodiments, setting the TTL value of the egress packet based on the TTL value of the traceroute probe can include decrementing the TTL value of the traceroute probe as received from the sending computer and setting the TTL value of the egress packet equal to the decremented TTL value of the traceroute probe.

In some embodiments, the computer-readable storage medium can further comprise instructions for controlling the one or more computer processors to detect an initial traceroute probe of a traceroute session and extract a flow signature from the initial traceroute probe, wherein the filter further matches for the flow signature, in addition to matching the first TTL value, to identify the traceroute probe.

In some embodiments, the computer-readable storage medium can further comprise instructions for controlling the one or more computer processors to receive a time exceeded message from an upstream device and in response to increment the hops counter by one.

In some embodiments, the filter can include a rule to match for an ingress packet having both an outer TTL and an inner TTL value of '1', and in response to the rule matching a received ingress packet from a sending network device, transmit a time exceeded message: to the sending network device when an inner destination media access control (DMAC) address in the received ingress packet is not the same as a MAC address of the network device; and to the sending computer when the inner DMAC in the received ingress packet is the same as the MAC address of the network device.

In accordance with embodiments of the present disclosure, a network device can include one or more computer processors; and a computer-readable storage medium comprising instructions for controlling the one or more computer processors to process traceroute probes received from a sending computer during a traceroute session, wherein the sending computer initiates the traceroute session, wherein the instructions which when executed by the one or more computer processors cause the one or more computer processors to receive a first traceroute probe from the sending computer, the first traceroute probe having a TTL value set by the sending computer; adjust the TTL value of the first traceroute probe based on a number of hops detected between the sending computer and a receiving computer; and forward the first traceroute probe with the adjusted TTL value to an upstream device toward the receiving computer.

In some embodiments, the computer-readable storage medium can further comprise instructions for controlling the one or more computer processors to encapsulate the first traceroute probe with the adjusted TTL value in an egress packet; compute an outer TTL value for the egress packet based on the TTL value of the first traceroute probe as received from the sending computer; and forward the egress packet to the upstream device.

In some embodiments, the computer-readable storage medium can further comprise instructions for controlling the one or more computer processors to detect an initial traceroute probe of a traceroute session and extract a flow signature from the initial traceroute probe, wherein the filter further matches for the flow signature in addition to matching the first TTL value to identify the traceroute probe.

In some embodiments, the computer-readable storage medium can further comprise instructions for controlling the one or more computer processors to update the hops counter each time the network device is the destination of a time exceeded message.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a network device for gathering information about network devices along a path between a sending computer and a receiving computer, the method comprising the network device:
receiving a stream of ingress packets from the sending computer;
identifying a traceroute probe in the stream of ingress packets using a filter that matches for a first time-to-live (TTL) value in the stream of ingress packets;
encapsulating the traceroute probe in an egress packet including:
decrementing a TTL value of the traceroute probe (inner TTL value);
determining a TTL value of the egress packet (outer TTL value) based on the decremented inner TTL value; and
adjusting the decremented inner TTL value by an amount based on a hops counter that indicates a number of network devices along a segment of the path between the sending computer and the receiving computer;
forwarding the egress packet; and
updating the filter to match for a second TTL value in the stream of ingress packets to identify a subsequent traceroute probe in the stream of ingress packets.

2. The method of claim 1, wherein the filter matches for a flow signature indicative of the sending computer, in addition to matching the first TTL value, to identify the traceroute probe.

3. The method of claim 2, further comprising detecting an initial traceroute probe of a traceroute session and extracting the flow signature from the initial traceroute probe, wherein the flow signature identifies subsequent traceroute probes in the traceroute session.

4. The method of claim 3, wherein the filter includes a rule comprising a match criterion that matches for a TTL value of '1' in the stream of ingress packets to identify the initial traceroute probe.

5. The method of claim 1, wherein updating the filter includes adding a rule to the filter to match for the second TTL value.

6. The method of claim 1, further comprising receiving a time exceeded message from an upstream device and in response the network device incrementing the hops counter by one.

7. The method of claim 6, wherein the network device increments the hops counter by one only when the network device is the destination of the time exceeded message.

8. The method of claim 1, further comprising receiving a time exceeded message from an upstream device that is destined for the network device, and in response generating a new time exceeded message using address information contained in the received time exceeded message and transmitting the new time exceeded message to the sending computer.

9. The method of claim 1, wherein the network devices along the segment of the path between the sending computer and the receiving computer are routers.

10. The method of claim 1, wherein the filter includes a rule to match for an ingress packet having both an outer TTL and an inner TTL value of '1', and in response to the rule matching a received ingress packet from a sending network device, transmitting a time exceeded message:
  to the sending network device when an inner destination media access control (DMAC) address in the received ingress packet is not the same as a MAC address of the network device; and
  to the sending computer when the inner DMAC in the received ingress packet is the same as the MAC address of the network device.

11. A network device comprising:
  one or more computer processors; and
  a computer-readable storage medium comprising instructions for controlling the one or more computer processors to gather information about network devices along a path between a sending computer and a receiving computer, including:
    identifying a traceroute probe in a stream of ingress packets received from the sending computer using a filter that matches for a first time-to-live (TTL) value in the stream of ingress packets;
    adjusting a TTL value of the traceroute probe by an amount based on a hops counter that indicates a number of network devices along a segment of the path between the sending computer and the receiving computer;
    forwarding the traceroute packet having the adjusted TTL value; and
    updating the filter to match for a second TTL value in the stream of ingress packets to identify a subsequent traceroute probe in the stream of ingress packets.

12. The network device of claim 11, wherein the computer-readable storage medium further comprises instructions for controlling the one or more computer processors to encapsulate the traceroute probe in an egress packet including setting the TTL value of the egress packet based on the TTL value of the traceroute probe.

13. The network device of claim 12, wherein setting the TTL value of the egress packet based on the TTL value of the traceroute probe includes decrementing the TTL value of the traceroute probe as received from the sending computer and setting the TTL value of the egress packet equal to the decremented TTL value of the traceroute probe.

14. The network device of claim 11, wherein the computer-readable storage medium further comprises instructions for controlling the one or more computer processors to detect an initial traceroute probe of a traceroute session and extract a flow signature from the initial traceroute probe, wherein the filter further matches for the flow signature in addition to matching the first TTL value to identify the traceroute probe.

15. The network device of claim 11, wherein the computer-readable storage medium further comprises instructions for controlling the one or more computer processors to receive a time exceeded message from an upstream device and in response to increment the hops counter by one.

16. The network device of claim 11, wherein the filter includes a rule to match for an ingress packet having both an outer TTL and an inner TTL value of '1', and in response to the rule matching a received ingress packet from a sending network device, transmitting a time exceeded message:
  to the sending network device when an inner destination media access control (DMAC) address in the received ingress packet is not the same as a MAC address of the network device; and
  to the sending computer when the inner DMAC in the received ingress packet is the same as the MAC address of the network device.

17. A network device comprising:
  one or more computer processors; and
  a computer-readable storage medium comprising instructions for controlling the one or more computer processors to process traceroute probes received from a sending computer during a traceroute session, wherein the sending computer initiates the traceroute session, wherein the instructions which when executed by the one or more computer processors cause the one or more computer processors to:
  receive a first traceroute probe from the sending computer, the first traceroute probe having a TTL value set by the sending computer;
  adjust the TTL value of the first traceroute probe based on a number of hops detected between the sending computer and a receiving computer; and
  forward the first traceroute probe with the adjusted TTL value to an upstream device toward the receiving computer.

18. The network device of claim 17, wherein the computer-readable storage medium further comprises instructions for controlling the one or more computer processors to:
  encapsulate the first traceroute probe with the adjusted TTL value in an egress packet;
  compute an outer TTL value for the egress packet based on the TTL value of the first traceroute probe as received from the sending computer; and
  forward the egress packet to the upstream device.

19. The network device of claim 17, wherein the computer-readable storage medium further comprises instructions for controlling the one or more computer processors to detect an initial traceroute probe of a traceroute session and extract a flow signature from the initial traceroute probe, wherein the filter further matches for the flow signature in addition to matching the first TTL value to identify the traceroute probe.

20. The network device of claim 17, wherein the computer-readable storage medium further comprises instructions for controlling the one or more computer processors to update the hops counter each time the network device is the destination of a time exceeded message.

* * * * *